US012581360B2

(12) United States Patent
Lee et al.

(10) Patent No.: US 12,581,360 B2
(45) Date of Patent: Mar. 17, 2026

(54) METHOD AND DEVICE FOR UWB COMMUNICATION

(71) Applicant: Samsung Electronics Co., Ltd., Gyeonggi-do (KR)

(72) Inventors: Mingyu Lee, Gyeonggi-do (KR); Jonghoe Koo, Gyeonggi-do (KR); Youngwan So, Gyeonggi-do (KR); Hyunseob Oh, Gyeonggi-do (KR); Junyoung Choi, Gyeonggi-do (KR); Taeyoung Ha, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 356 days.

(21) Appl. No.: 17/994,838

(22) Filed: Nov. 28, 2022

(65) Prior Publication Data

US 2023/0171642 A1      Jun. 1, 2023

(30) Foreign Application Priority Data

Nov. 26, 2021      (KR) ........................ 10-2021-0166056

(51) Int. Cl.
| | |
|---|---|
| *H04W 28/06* | (2009.01) |
| *H04B 1/7163* | (2011.01) |
| *H04J 3/06* | (2006.01) |
| *H04L 9/06* | (2006.01) |
| *H04W 4/80* | (2018.01) |

(52) U.S. Cl.
CPC ........ *H04W 28/065* (2013.01); *H04B 1/7163* (2013.01); *H04J 3/0661* (2013.01); *H04L 9/0631* (2013.01); *H04L 9/0662* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 10,559,149 | B1 | 2/2020 | Kuechler |
| 10,992,419 | B1* | 4/2021 | Zhou ..................... H04L 1/0618 |
| 11,184,153 | B2 | 11/2021 | Hammerschmidt et al. |
| 2020/0351811 | A1* | 11/2020 | Li ........................ H04W 64/00 |
| 2021/0014677 | A1 | 1/2021 | Han et al. |
| 2021/0242901 | A1* | 8/2021 | Hammerschmidt ........................ H04W 52/0258 |

(Continued)

OTHER PUBLICATIONS

Yong Liu et al., "NBA-MMS-UWB MAC Considerations", IEEE P802.15 Working Group for Wireless Personal Area Networks (WPANs), Nov. 2021, 10 pages.

(Continued)

*Primary Examiner* — Jay L Vogel
(74) *Attorney, Agent, or Firm* — The Farrell Law Firm, P.C.

(57) ABSTRACT

A method for performing fragmented transmission is disclosed. The method by a first ultra-wide band (UWB) device includes identifying a transport packet for fragmented transmission, obtaining a plurality of fragmented packets from the transport packet, and transmitting the plurality of fragmented packets through a UWB channel to a second UWB device at a preset transmission interval. Each of the plurality of fragmented packets may include an STS field and a fragmented payload, and the STS field may be included in a front end of the fragmented packet.

14 Claims, 28 Drawing Sheets

(56)                    References Cited

U.S. PATENT DOCUMENTS

2022/0137177 A1 *    5/2022   Hammerschmidt  .. G01S 13/003
                                                         455/456.1
2022/0141657 A1 *    5/2022   Hammerschmidt  ........................
                                                        H04L 25/0224
                                                                 726/3

OTHER PUBLICATIONS

International Search Report dated Feb. 23, 2023 issued in counter-
part application No. PCT/KR2022/018892, 7 pages.
European Search Report dated Feb. 4, 2025 issued in counterpart
application No. 22899104.8-1215, 8 pages.

* cited by examiner

200

210

220

First electronic device

Second electronic device

| Octets: 2 | 0/1 | 0/2/6 | 0/1/2/6 | 0/1 | variable | variable | 2/4 |
|---|---|---|---|---|---|---|---|
| Frame Control | Sequence Number | Destination Address | Source Address | Auxiliary Security Header | Header IE (s) | Payload IE (s) | FCS |
| MAC header | | | | | | MAC payload | MAC footer |

Arrow shows RMARKER reference position, in each case

| Bits: 0 | 1 | 2 | 3 | 4 | 5-6 | 7 | Octets: 0/4 | 0/4 | 0/4 | 0/4 | 0/16 | 0/4/8/16 |
|---|---|---|---|---|---|---|---|---|---|---|---|---|
| V3P | V2P | V1P | VCP | SKP | ACP | CP | V3 | V2 | V1 | V Counter | STS Key | Application Code |

METHOD AND DEVICE FOR UWB COMMUNICATION

CROSS-REFERENCE TO RELATED APPLICATION(S)

This application is based on and claims priority under 35 U.S.C. § 119 to Korean Patent Application No. 10-2021-0166056, filed on Nov. 26, 2021, in the Korean Intellectual Property Office, the disclosure of which is incorporated herein by reference in its entirety.

BACKGROUND

1. Field

The disclosure relates to UWB communication and, more particularly, to a method and device for fragmented transmission of packets.

2. Description of Related Art

The Internet, which is a human centered connectivity network where humans generate and consume information, is now evolving to the Internet of things (IoT) where distributed entities, such as things, exchange and process information without human intervention. The Internet of everything (IoE), which is a combination of IoT technology and big data processing technology through connection with a cloud server, has emerged. As technology elements, such as sensing technology, wired/wireless communication and network infrastructure, service interface technology, and security technology have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

As various services can be provided with the development of wireless communication systems, a method for effectively providing these services is required. For example, a ranging technique for measuring a distance between electronic devices using ultra-wide band (UWB) may be used.

SUMMARY

The present disclosure provides a packet format, method and device for fragmented transmission of packets.

According to an aspect, a method by a first ultra-wide band (UWB) device includes identifying a transport packet for fragmented transmission, obtaining a plurality of fragmented packets from the transport packet, and transmitting the plurality of fragmented packets through a UWB channel to a second UWB device at a preset transmission interval. Each of the plurality of fragmented packets may include a scrambled timestamp sequence (STS) field and a fragmented payload. The STS field may be included in a front end of the fragmented packet.

According to another aspect, a method by a second UWB device includes receiving a plurality of fragmented packets from a first UWB device through a UWB channel at a preset transmission interval and obtaining a transport packet from the plurality of fragmented packets. Each of the plurality of fragmented packets may include an STS field and a fragmented payload. The STS field may be included in a front end of the fragmented packet.

According to another aspect, a first UWB device includes a transceiver and at least one processor configured to identify a transport packet for fragmented transmission, obtain a plurality of fragmented packets from the transport packet, and transmit the plurality of fragmented packets through a UWB channel to a second UWB device at a preset transmission interval. Each of the plurality of fragmented packets may include an STS field and a fragmented payload. The STS field may be included in a front end of the fragmented packet.

According to another aspect, a second UWB device includes a transceiver and at least one processor configured to receive a plurality of fragmented packets from a first UWB device through a UWB channel at a preset transmission interval and obtain a transport packet from the plurality of fragmented packets. Each of the plurality of fragmented packets may include an STS field and a fragmented payload. The STS field may be included in a front end of the fragmented packet.

BRIEF DESCRIPTION OF THE DRAWINGS

The above and other aspects, features, and advantages of certain embodiments of the disclosure will be more apparent from the following detailed description taken in conjunction with the accompanying drawings, in which:

FIG. 4 illustrates a structure of a UWB MAC frame according to an embodiment;

FIG. 9 illustrates an example of an RSKD IE according to an embodiment;

DETAILED DESCRIPTION

Figure 1:
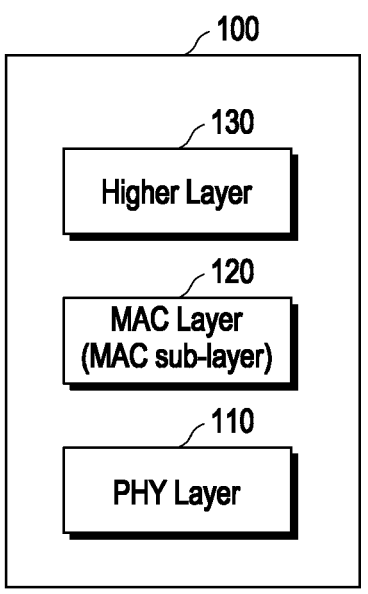
FIG. 1 illustrates an architecture of an electronic device according to an embodiment.

Hereinafter, embodiments of the disclosure are described in detail with reference to the accompanying drawings.

In describing embodiments, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the unit is not limited as meaning a software or hardware element. A unit may be configured in a storage medium that may be addressed or may be configured to reproduce one or more processors. Accordingly, as an example, a unit includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a unit may be combined with additional elements or may be split into sub elements or sub units. Further, an element or a unit may be implemented to reproduce one or more CPUs in a device or a security multimedia card. According to embodiments of the disclosure, a unit may include one or more processors.

As used herein, a "terminal" or "device" may also be referred to as a mobile station (MS), user equipment (UE), user terminal (UT), terminal, wireless terminal, access terminal (AT), subscriber unit, subscriber station (SS), wireless device, wireless communication device, wireless transmit/receive unit (WTRU), mobile node, or mobile, and may be referred to in other terms. Various embodiments of the terminal may include cellular phones, smart phones with wireless communication capabilities, personal digital assistants (PDAs) with wireless communication capabilities, wireless modems, portable computers with wireless communication capabilities, capturing/recording/shooting/filming devices, such as digital cameras, having wireless communication capabilities, game players with wireless communications capabilities, music storage and playback home appliances with wireless communications capabilities, Internet home appliances capable of wireless Internet access and browsing, or portable units or terminals incorporating combinations of those capabilities. Further, the terminal may include an M2M) terminal and an MTC terminal/device, but is not limited thereto. In the disclosure, the terminal may also be referred to as an electronic device or simply as a device.

Hereinafter, the operational principle and embodiments of the disclosure is described below with reference to the accompanying drawings. When determined to make the subject matter of the disclosure unclear, the detailed description of the known functions or configurations may be skipped or omitted. The terms as used herein are defined considering the functions in the disclosure and may be replaced with other terms according to the intention or practice of the user or operator. Therefore, the terms should be defined based on the overall disclosure.

Further, although a communication system using UWB is described in connection with embodiments of the disclosure, as an example, embodiments of the disclosure may also apply to other communication systems with similar technical background or features. For example, a communication system using Bluetooth™ or ZigBee™ may be included therein. Further, embodiments of the disclosure may be modified in such a range as not to significantly depart from the scope of the disclosure under the determination by one of ordinary skill in the art and such modifications may be applicable to other communication systems.

In general, wireless sensor network technology is largely divided into a wireless local area network (WLAN) technology and a wireless personal area network (WPAN) technology according to the recognition distance. In this case, WLAN is a technology based on IEEE 802.11 which enables access to the backbone network within a radius of about 100 m. WPAN is a technology based on IEEE 802.15 which includes Bluetooth™, ZigBee™, and ultra-wide band (UWB). A wireless network in which such a wireless network technology is implemented may include a plurality of electronic devices.

According to the definitions by the Federal Communications Commission (FCC), UWB may refer to a wireless communication technology that uses a bandwidth of 500 MHz or more, or a bandwidth corresponding to a center frequency of 20% or more. UWB may mean a band itself to which UWB communication is applied. UWB may enable secure and accurate ranging between devices. Thus, UWB enables relative position estimation based on the distance between two devices or accurate position estimation of a device based on the distance from fixed devices (whose positions are known).

The terminology used herein is provided for a better understanding of the disclosure, and changes may be made thereto without departing from the technical spirit of the disclosure. Certain terminology used herein may include:

An application dedicated file (ADF) may be, e.g., a data structure in an application data structure that may host an application or application specific data.

An application protocol data unit (APDU) may be a command and a response used when communicating with the application data structure in the UWB device.

An application specific data may be, e.g., a file structure having a root level and an application level including UWB controllee information and UWB session data required for a UWB session.

A controller may be a ranging device that defines and controls ranging control messages (RCM) (or control messages).

A controllee may be a ranging device using a ranging parameter in the RCM (or control message) received from the controller.

Unlike static STS, dynamic scrambled timestamp sequence (STS) mode may be an operation mode in which the STS is not repeated during a ranging session. In this mode, the STS may be managed by the ranging device, and the ranging session key that generates STS may be managed by a secure component.

An applet may be, e.g., an applet executed on the secure component including UWB parameters and service data. In this disclosure, an applet may be a FiRa applet defined by FiRa.

A ranging device may be a device capable of performing UWB ranging. In the disclosure, the ranging device may be an enhanced ranging device (ERDEV) defined in IEEE 802.15.4z or a FiRa device defined by FiRa. The ranging device may be referred to as a UWB device.

A UWB-enabled application may be an application for UWB service. For example, the UWB-enabled application may be an application using a framework API for configuring an out-of-band (OOB) connector, a secure service, and/or a UWB service for a UWB session. In this disclosure, a UWB-enabled application" may be abbreviated as an application or a UWB application. The UWB-enabled application may be a FiRa-enabled application defined by FiRa.

A framework may be a component that provides access to profiles, individual-UWB configurations and/or notifications. The Framework may be, e.g., a collection of logical software components including profile manager, OOB connector, secure service, and/or UWB service. In the disclosure, the framework may be a FiRa framework defined by FiRa.

An OOB Connector may be a software component for establishing an OOB connection (e.g., a BIE connection) between ranging devices. In the disclosure, the OOB connector may be a FiRa OOB connector defined by FiRa.

A profile may be a previously defined set of UWB and OOB configuration parameters. In the disclosure, profile may be a FiRa profile defined by FiRa.

profile manager may be a software component that implements a profile available on the ranging device. In the disclosure, the profile manager may be a FiRa profile manager defined by FiRa.

A service may be an implementation of a use case that provides a service to an end-user.

A smart ranging device may be a ranging device that may implement an optional framework API. In the disclosure, the smart ranging device may be a FiRa smart device defined by FiRa.

A global dedicated file (GDF) may be a root level of application specific data including data required to establish a UWB session.

A framework API may be an API used by a UWB-enabled application to communicate with the framework.

An initiator may be a ranging device that initiates a ranging exchange.

An object identifier (OID) may be an identifier of the ADF in the application data structure.

OOB may be data communication that does not use UWB as an underlying wireless technology.

A ranging data set (RDS) may be data (e.g., UWB session key, session ID, etc.) required to establish a UWB session when it is needed to protect confidentiality, authenticity and integrity.

A responder" may be a ranging device that responds to the initiator in a ranging exchange.

STS may be a ciphered sequence for increasing the integrity and accuracy of ranging measurement timestamps. The STS may be generated from the ranging session key.

A secure channel may be a data channel that prevents overhearing and tampering.

A secure component may be an entity (e.g., a secure element (SE) or a trusted execution environment (TEE)) having a defined security level that interfaces with a UWB subsystem (UWBS) for the purpose of providing RDS to the UWBS, e.g., when dynamic STS is used.

An SE may be a tamper-resistant secure hardware component that may be used as a secure component in the ranging device.

Secure ranging may be ranging based on STS generated through a strong encryption operation.

Secure service may be a software component for interfacing with a secure component, such as an SE or a TEE.

A service applet may be an applet on a secure component that handles service specific transactions.

Service data may be data defined by a service provider that needs to be transferred between two ranging devices to implement a service.

A service provider may be an entity that defines and provides hardware and software required to provide a specific service to an end-user.

Static STS mode is an operation mode in which STS is repeated during a session, and does not need to be managed by the secure component.

A secure UWB service (SUS) applet may be an applet on the SE that communicates with the applet to retrieve data needed to enable secure UWB sessions with other ranging devices. The SUS applet may transfer corresponding data (information) to the UWBS.

A UWB service may be a software component that provides access to the UWBS.

A UWB session may be a period from when the controller and the controllee start communication through UWB until the communication stops. A UWB session may include ranging, data transfer, or both ranging and data transfer.

A UWB session ID may be an ID (e.g., a 32-bit integer) that identifies the UWB session, shared between the controller and the controller.

A UWB session key may be a key used to protect the UWB session. The UWB session key may be used to generate the STS. In this disclosure, the UWB session key may be a UWB ranging session key (URSK), and may be abbreviated as a session key.

A UWB subsystem (UWBS) may be a hardware component implementing the UWB PHY and MAC layers specifications. UWBS may have an interface to framework and an interface to secure component to search for RDS. In this disclosure, the UWB PHY and MAC specifications may be, e.g., FiRa PHY and FiRa MAC specifications defined by FiRa referring to IEEE 802.15.4/4z.

One-way ranging (OWR) may be a ranging scheme using a time difference of arrival (TDoA) localization method. The TDoA method corresponds to a method for locating a mobile device based on a relative arrival time of a single message or multiple messages. For a description of OWR (TDoA), reference may be made to the description of IEEE 802.15.4z. As an example of the OWR scheme, a downlink (DL)-TDoA scheme may be included.

DL-TDoA (DT) may be a localization method using TDoA measurement from a plurality of DT-anchors. In an embodiment, the DT-anchors may exchange DT messages (DTMs) (ranging messages) with each other, and the DT-tag may passively receive the DTM. Each DT-tag receiving DTMs may calculate the TDoA using at least one of the reception timestamp of each DTM, the transmission timestamp of DTMs included in the corresponding DTMs, or the reply time included in the DTMs. The DT-tag may estimate its location based on at least one of the calculated coordinates of TDoA and DT-anchors.

Two-way ranging (TWR) may be a ranging scheme capable of estimating a relative distance between two devices by measuring time of flight (ToF) through the exchange of ranging messages between the two devices. The TWR scheme may be one of double-sided two-way ranging (DS-TWR) and single-sided two-way ranging (SS-TWR). SS-TWR may be a procedure for performing ranging through one round-trip time measurement. DS-TWR may be a procedure for performing ranging through two round-trip time measurements. For a description of SS-TWR and DS-TWR, reference may be made to the description of IEEE 802.15.4z.

A UWB message may be a message including a payload information element (IE) transmitted by the UWB device (e.g., ERDEV).

The ranging message may be a message transmitted by a UWB device (e.g., ERDEV) in a UWB ranging procedure. For example, the ranging message may be a message, such as a ranging initiation message (RIM), a ranging response message (RRM), a ranging final message (RFM), or a measurement report message (MRM), transmitted by a UWB device (e.g., ERDEV) in a specific phase of the ranging round. A ranging message may include one or more UWB messages. If necessary, a plurality of ranging messages may be merged into one message. For example, in the case of non-deferred DS-TWR ranging, RFM and MRM may be merged into one message in a ranging final phase.

A UWB channel may be one of candidate UWB channels allocated for UWB communication. Candidate UWB channels allocated for UWB communication may be channels allocated for UWB communication defined in IEEE 802.15.4/4z. The UWB channel may be used for UWB ranging and/or transaction. For example, the UWB channel may be used for transmission/reception of a ranging frame (RFRAME) and/or transmission/reception of a data frame.

A narrow band (NB) channel may be a channel having a narrower bandwidth than the UWB channel. In an embodiment, the NB channel may be a subchannel of one of the candidate UWB channels allocated for UWB communication. Candidate UWB channels allocated for UWB communication may be channels allocated for UWB communication defined in IEEE 802.15.4/4z. The NB channel may be used for advertising, device discovery, and/or connection setup for additional parameter negotiation/authentication. For example, the NB channel may be used for transmission and reception of an advertisement message, an additional advertising message, a connection request message, and/or a connection confirmation message.

Normal transmission may be a scheme for transmitting one complete UWB PHY packet without division. In an embodiment, a complete UWB PHY packet used for normal transmission may be an SP0 packet, an SP1 packet, an SP2 packet, or an SP3 packet (e.g., the SP0 packet, SP1 packet, SP2 packet, or SP3 packet in (b) of FIG. 5 to be described below). In the disclosure, the SP0 packet, SP1 packet, SP2 packet or SP3 packet format in (b) of FIG. 5 may be referred to as a legacy packet format.

Fragmented packet transmission/fragmented transmission may be a scheme in which one complete UWB PHY packet is fragmented by a preset scheme and transmitted. In an embodiment, a complete UWB PHY packet used for fragmented transmission may be a UWB PHY packet newly defined for fragmented transmission or a UWB PHY packet used for normal transmission (e.g., the SP0 packet, SP1 packet, SP2 packet or SP3 packet in (b) of FIG. 5). In the disclosure, the newly defined packet format for fragmented transmission may be referred to as a fragmented transmission packet format. The legacy packet format and the fragmented transmission packet format may be indicated through one field (e.g., STS packet (SP) setting field) or may be indicated through each separate field.

In the disclosure, the STS used for normal transmission or fragmented transmission may be referred to as a first STS, a first type STS, and a normal STS. The STS used only for fragmented transmission may be referred to as a second STS, a second type STS, and an STS for fragmented transmission. As an example, the second type STS may have a shorter length than the first type STS (short STS). STS configuration information (e.g., STS generation data (V), STS key, or STS index) for generating the second type STS may be exchanged through an NB channel. As an example, STS configuration information (e.g., STS generation data (V) or STS key) for generating the first type STS may be exchanged through an OOB channel, an NB channel, or a UWB channel.

Hereinafter, various embodiments of the disclosure are described with reference to the accompanying drawings.

FIG. 1 illustrates an architecture of an electronic device according to an embodiment.

In the disclosure, the electronic device may be one of various types of electronic devices. For example, the electronic device may be a portable device (e.g., a UE, a smartphone, a wearable device, a vehicle, or a tag device) or a stationary device (e.g., a door lock or an anchor device).

Referring to FIG. 1, the electronic device 100 may include a PHY layer 110, a MAC layer (MAC sublayer) 120, and/or a higher layer 130.

(1) PHY Layer

The PHY layer 110 may include a low-level control entity and at least one transceiver. In this disclosure, the transceiver may be referred to as a radio frequency (RF) transceiver or a radio transceiver.

At least one transceiver may include a first transceiver supporting UWB communication (e.g., an IEEE 802.15.4z-based UWB communication), a second transceiver supporting NB communication using a narrower bandwidth than that of UWB communication, and/or a third transceiver supporting other communication technologies (e.g., Bluetooth™ or BIE). In this disclosure, the first transceiver may be referred to as a UWB transceiver. The second transceiver may be referred to as an NB transceiver. The third transceiver may be referred to as an OOB transceiver. According to an embodiment, one transceiver may support a plurality of communication technologies. For example, one transceiver may support UWB communication and NB communication.

The PHY layer 110 may support at least one of the following functions:

Transceiver activation and deactivation function (transceiver on/off function)

Energy detection function

Channel selection function

Clear channel assessment (CCA) function

Synchronization function

Low-level signaling function

UWB ranging, positioning and localization functions

Spectrum resource management function

Function to transmit/receive packets through physical medium (2) MAC Layer

The MAC layer 120 provides an interface between the upper layer 130 and the PHY layer 110.

The MAC layer 120 may provide two services as follows:

MAC data service: A service that enables transmission and reception of MAC protocol data unit (PDU) through the PHY MAC management service: Service interfacing to MAC sublayer management entity (MLME) service access point (SAP) (MLME-SAP)

The MAC layer 120 may support at least one of the following functions:

Device discovery and connection setup function

Channel access function (function of access to physical channel (e.g., NB channel/UWB channel/OOB channel))

Synchronization function

Interference mitigation function based on energy detection

Functions related to NB signaling

Guaranteed timeslot (GTS) management function

Frame delivery function

UWB ranging function

PHY parameter change notification function

Security function (3) Upper Layer

The upper layer 130 may include a network layer providing functions, such as network configuration and message routing, and/or an application layer providing an intended function of the device. The application layer may be a UWB-enabled application layer for providing a UWB service.

Figure 2:
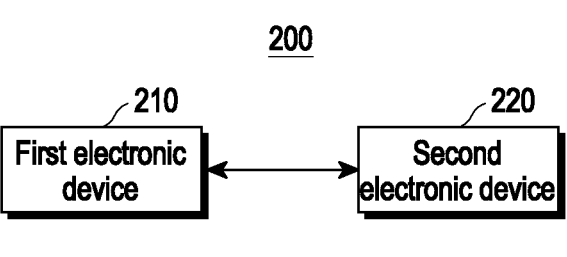
FIG. 2 illustrates a communication system including a plurality of electronic devices according to an embodiment.

FIG. 2 illustrates a communication system including a plurality of electronic devices according to an embodiment.

Referring to FIG. 2, a communication system 200 may include a first electronic device 210 and a second electronic device 220. The first electronic device 210 and/or the second electronic device 220 may be the electronic device 100 of FIG. 1.

The first electronic device 210 may communicate with the second electronic device 220 for device discovery, connection setup, ranging (e.g., UWB ranging), data communication, and/or other purposes.

The first electronic device 210 may communicate with the second electronic device 220 according to a preset communication scheme (technology). For example, the first electronic device 210 may perform wireless communication with the second electronic device 220 using a UWB communication scheme, an NB communication scheme, and/or an OOB communication scheme.

In the disclosure, the UWB communication scheme may perform communication through at least one of candidate UWB channels allocated for UWB communication. Example candidate UWB channels allocated for UWB communication may be shown in Table 1 below.

TABLE 1

| Band group[a] (decimal) | Channel number (decimal) | Center frequency, $f_c$ (MHz) | Band width (MHz) | Mandatory/ Optional |
|---|---|---|---|---|
| 0 | 0 | 499.2 | 499.2 | Mandatory below 1 GHz |
| 1 | 1 | 3494.4 | 499.2 | Optional |
| | 2 | 3993.6 | 499.2 | Optional |
| | 3 | 4492.8 | 499.2 | Mandatory in low band |
| | 4 | 3993.6 | 1331.2 | Optional |
| 2 | 5 | 6489.6 | 499.2 | Optional |
| | 6 | 6988.6 | 499.2 | Optional |
| | 7 | 6489.6 | 1081.6 | Optional |
| | 8 | 7488.0 | 499.2 | Optional |
| | 9 | 7987.2 | 499.2 | Mandatory in high band |
| | 10 | 8486.4 | 499.2 | Optional |
| | 11 | 7987.2 | 1331.2 | Optional |
| | 12 | 8985.6 | 499.2 | Optional |
| | 13 | 9484.8 | 499.2 | Optional |
| | 14 | 9984.0 | 499.2 | Optional |
| | 15 | 9484.8 | 1354.97 | Optional |

[a]Note that bands indicates a sequence of adjacent HRP UWB center frequencies; band 0 is the sub-gigahertz channel, band 1 has the low-band HRP UWB channels, and band 2 has the high-band channels.

At least one of the channels in Table 1 may be assigned as a UWB channel supported by the UWB transceiver. For example, channel number 5 and/or 9 of Table 1 may be allocated as a UWB channel.

NB communication may support at least one NB channel having a narrower bandwidth than the UWB channel.

The NB channel may be a subchannel of one of the candidate UWB channels allocated for UWB communication. As described above, example candidate UWB channels allocated for UWB communication may be shown in Table 1 above.

Meanwhile, as in Table 1 above, the candidate UWB channels mainly have a bandwidth of 500 MHz or more. Therefore, using it as it is may be disadvantageous in power spectral density (energy detection), so that it may be necessary to divide the corresponding channel into a plurality of subchannels (NB channels) and use them. For example, NB channels need to be used for device discovery (or advertisement) and/or connection setup.

Figure 3:
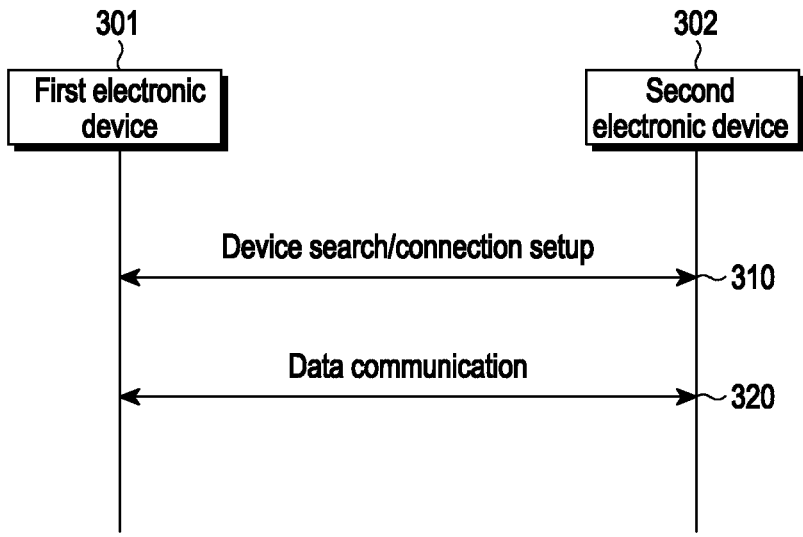
FIG. 3 illustrates a method for performing communication by a plurality of electronic devices according to an embodiment.

FIG. 3 illustrates a method for performing communication by a plurality of electronic devices according to an embodiment.

The first electronic device 301 and the second electronic device 302 of FIG. 3 may be, e.g., the electronic devices of FIG. 1 or 2.

Referring to FIG. 3, the first electronic device 301 and the second electronic device 302 may perform a device search/ connection setup procedure 310 and a data communication procedure 320. The device search/connection setup procedure 310 and data communication procedure 320 may be managed or controlled by the MAC layer (entity) of the electronic device.

(1) Device Search/Connection Setup Procedure

The device search/connection setup procedure 310 may be a prior procedure performed before the data communication procedure 320. As an example, the device discovery/ connection setup procedure 310 may be performed over OOB communication (channel), NB communication (channel), and/or UWB communication (channel).

The device search/connection setup procedure 310 may include at least one of the following operations:

Device discovery operation: An operation in which the electronic device searches for (discovers) another UWB devices. The device discovery operation may include an operation for transmitting/receiving an advertisement message. The device discovery operation may be referred to as a discovery operation or an advertising operation.

Connection setup operation: An operation in which two electronic devices establish a connection. The connection setup operation may include an operation for transmitting/receiving a connection request message and a connection confirmation message. A connection (channel) established through the connection setup operation may be used to configure and control a UWB session for data communication. For example, parameters (e.g., UWB performance parameters (controllee performance parameters), UWB configuration parameters, session key-related parameters) for configuring a UWB session through a secure channel established through the connection setup operation may be negotiated between two electronic devices.

(2) Data Communication Procedure

The data communication procedure 320 may be a procedure for transmitting and receiving data using UWB communication. The data communication procedure may be performed by UWB communication or NB communication.

The data communication procedure 320 may include at least one of the following operations.

UWB ranging operation: An operation in which the electronic device performs UWB ranging with another electronic device in a preset UWB ranging scheme (e.g., OWR, SS-TWR, DS-TWR scheme). The UWB ranging operation may include a ToF measurement operation and/or an angle of arrival (AoA) measurement operation.

Transaction operation. An operation in which an electronic device exchanges service data with another electronic device.

FIG. 4 illustrates a structure of a UWB MAC frame according to an embodiment.

In the embodiment of FIG. 4, the UWB MAC frame may follow the MAC frame structure of IEEE 802.15.4z, for example. In this disclosure, the UWB MAC frame may be simply referred to as a MAC frame or a frame. The UWB MAC frame may be used to transfer UWB data (e.g., UWB message, ranging message, control information, service data, application data, transaction data, etc.).

Referring to FIG. 4, the UWB MAC frame may include a MAC header (MHR), a MAC payload and/or a MAC footer (MFR).

(1) MAC Header

The MAC header may include a Frame Control field, a Sequence Number field, a Destination Address field, a Source Address field, an Auxiliary Security Header field, and/or at least one Header IE field. According to an embodiment, some fields may not be included in the MAC header.

The Frame Control field may include a Frame type field, a Security Enabled field, a Frame Pending field, an AR field, a PAN ID Compression field, a Sequence Number Suppression field, an IE Present field, a Destination Addressing Mode field, a Frame Version field, and/or a Source Addressing Mode field. Each field is described below.

The Frame Type field may indicate the frame type. As an embodiment, the frame type may include a data type and/or a multipurpose type.

The Security Enabled field may indicate whether an Auxiliary Security Header field exists. The Auxiliary Security Header field may include information required for security processing.

The Frame Pending field may indicate whether the device transmitting the frame has more data for the recipient. In other words, the Frame Pending field may indicate whether there is a pending frame for the recipient.

The AR field may indicate whether acknowledgment for frame reception is required from the recipient.

The PAN ID Compression field may indicate whether the PAN ID field exists.

The Sequence Number Suppression field may indicate whether the Sequence Number field exists. The Sequence Number field may indicate the sequence identifier for the frame.

The IE Present field may indicate whether the Header IE field and the Payload IE field are included in the frame.

The Destination Addressing Mode field may indicate whether the Destination Address field may include a short address (e.g., 16 bits) or an extended address (e.g., 64 bits). The Destination Address field may indicate the address of the recipient of the frame.

The Frame Version field may indicate the frame version. For example, the Frame Version field may be set to a value indicating IEEE std 802.15.4z-2020.

The Source Addressing Mode field may indicate whether the Source Address field exists, and if the Source Address field exists, whether the Source Address field includes a short address (e.g., 16 bits) or an extended address (e.g., 64 bits). The Source Address field may indicate the address of the originator of the frame.

(2) MAC Payload

The MAC payload may include at least one Payload IE field. The Payload IE field may include a Vendor Specific Nested IE. The Payload IE field may include the Payload IE field of the UWB message, ranging message or control message.

(3) MAC Footer

The MAC footer may include an FCS field. The FCS field may include a 16-bit cyclic redundancy code (CRC) or a 32-bit CRC.

Figure 5:
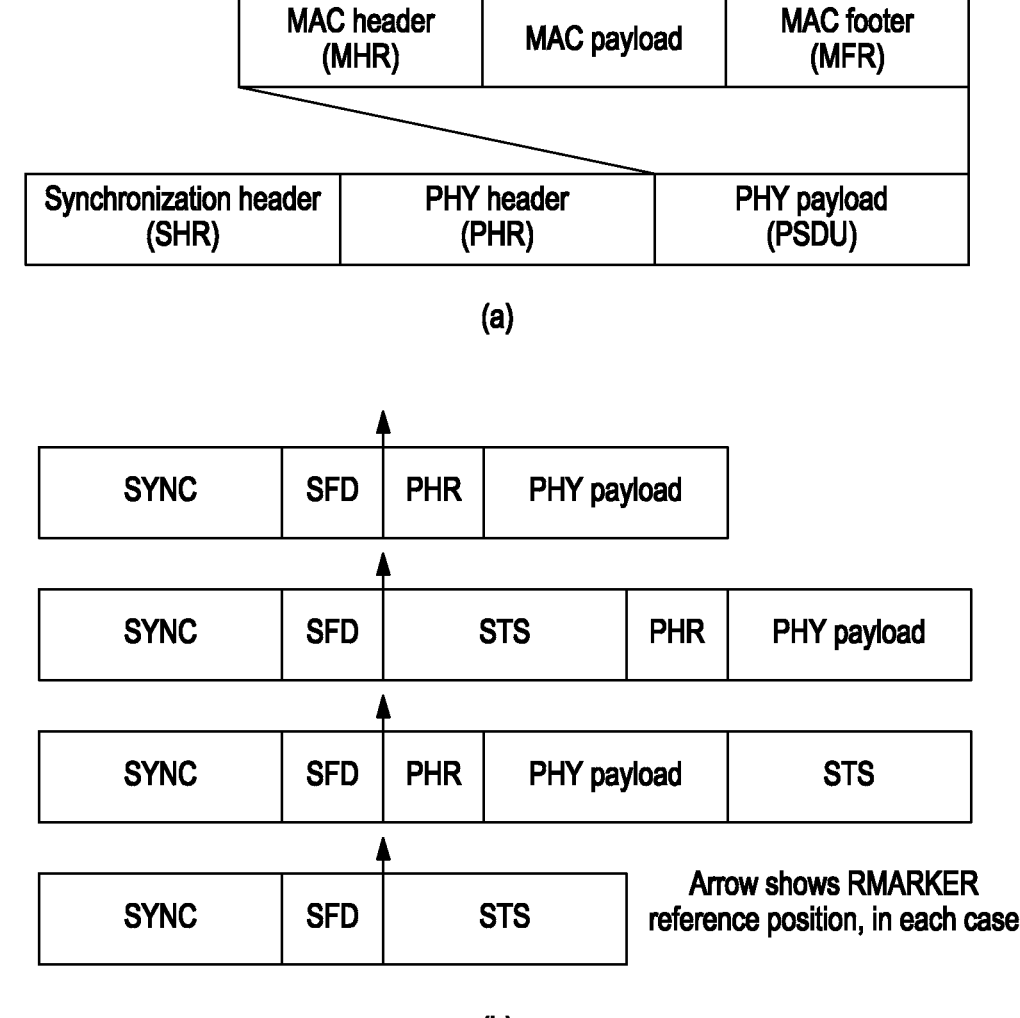
FIG. 5 illustrates a structure of a UWB PHY packet according to an embodiment.

FIG. 5 illustrates a structure of a UWB PHY packet according to an embodiment.

In FIG. 5, (a) illustrates a structure of a UWB PHY packet to which the STS packet configuration is not applied, and (b) of FIG. 5 illustrates a structure of a UWB PHY packet to which the STS packet configuration is applied. In the disclosure, the UWB PHY packet may be referred to as a PHY packet, a PHY PDU (PPDU), or a frame.

Referring to (a) of FIG. 5, the PPDU may include a synchronization header (SHR), a PHY header (PHR), and a PHY payload (PSDU). The PSDU may include a MAC frame. As shown in FIG. 4, the MAC frame may include a MAC header (MHR), a MAC payload and/or a MAC footer (MFR). The synchronization header part may be referred to as a preamble, and the part including the PHY header and the PHY payload may be referred to as a data part.

The SHR may be used for synchronization for signal reception and may include a SYNC field and a start-of-frame delimiter (SFD).

The SYNC field may be a field including a plurality of preamble symbols used for synchronization between transmission/reception devices. The preamble symbol may be set through one of previously defined preamble codes.

The SFD field may be a field indicating the end of the SHR and the start of the data field.

The PHY header may provide information about the configuration of the PHY payload. For example, the PHY header may include information about the length of the PSDU, information indicating whether the current frame is an RFRAME, and the like.

Meanwhile, the PHY layer of the UWB device may include an optional mode to provide a reduced on-air time for high density/low power operation. In this case, the UWB PHY packet may include an encrypted sequence (i.e., STS) to increase the integrity and accuracy of the ranging measurement timestamp. An STS may be included in the STS field of the UWB PHY packet and be used for security ranging.

Referring to (b) of FIG. 5, in the case of STS packet (SP) setting 0 (SP0), the STS field is not included in the PPDU (SP0 packet). In the case of SP setting 1 (SP1), the STS field is positioned immediately after the start-of-frame delimiter (SFD) field and before the PHR field (SP1 packet). In the case of SP setting 2 (SP2), the STS field is positioned after the PHY payload (SP2 packet). In the case of SP setting 3 (SP3), the STS field is positioned immediately after the SFD field, and the PPDU does not include the PHR and data field (PHY payload) (SP3 packet). In other words, in the case of SP3, the PPDU does not include the PHR and PHY payload.

In (b) of FIG. 5(*b*), each UWB PHY packet may include an RMARKER for defining a reference time. The RMARKER may be used to obtain the transmission time, reception time and/or time range of the ranging message (frame) in the UW B ranging procedure.

Figure 6:
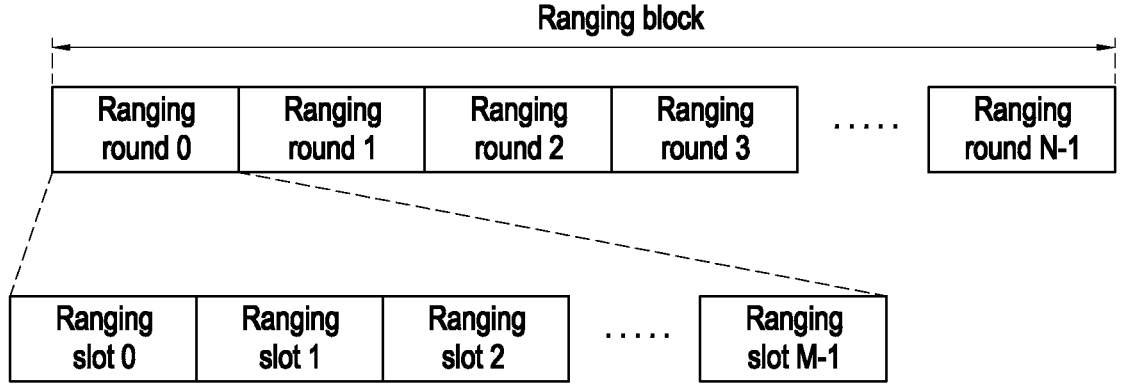
FIG. 6 illustrates a structure of a ranging block and round used for UWB ranging according to an embodiment.

FIG. 6 illustrates a structure of a ranging block and round used for UWB ranging according to an embodiment.

In this disclosure, the ranging block refers to a time period for ranging. The ranging round may be a period of sufficient duration to complete one entire range-measurement cycle (ranging cycle) in which a set of UWB devices participating in a ranging exchange involves. The ranging slot may be a sufficient period for transmission of at least one ranging frame (RFRAME) (e.g., ranging initiation/reply/final message, etc.).

As shown in FIG. 6, one ranging block may include at least one ranging round. Each ranging round may include at least one ranging slot.

When the ranging mode is a block-based mode, a mean time between contiguous ranging rounds may be a constant. Alternatively, when the ranging mode is an interval-based mode, the time between contiguous ranging rounds may be dynamically changed. In other words, the interval-based mode may adopt a time structure having an adaptive spacing.

The number and duration of slots included in the ranging round may be changed between ranging rounds.

In the disclosure, a ranging block, a ranging round, and a ranging slot may be abbreviated as a block, a round, and a slot.

Figure 7:
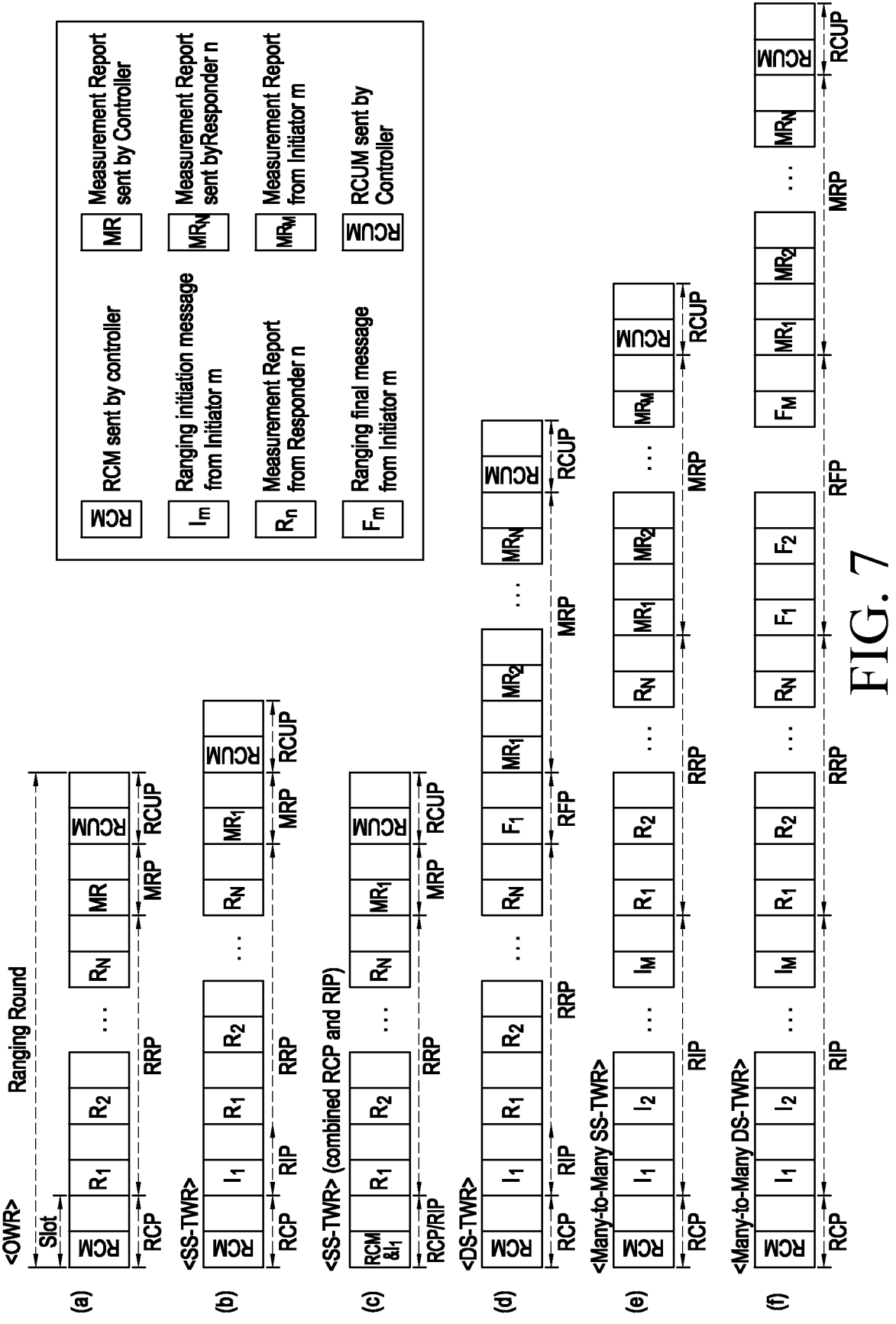
FIG. 7 illustrates a ranging message exchange procedure according to a ranging scheme according to an embodiment.

FIG. 7 illustrates a ranging message exchange procedure according to a ranging scheme according to an embodiment.

The embodiment of FIG. 7 shows an operation for exchanging messages for ranging in one ranging cycle (ranging round) according to the ranging scheme (type). The ranging scheme (type) used may be indicated by a ranging control message (RCM). As an example, RCM may be transmitted in the first slot of the corresponding ranging round.

Referring to (a) of FIG. 7, a ranging procedure (OWR procedure) using the OWR scheme may include at least one phase for exchanging ranging messages. The OWR procedure may include a ranging control phase (RCP), a ranging initiation phase (RIP), a ranging response phase (RRP), a ranging final phase (RFP), a measurement report phase (MRP), and/or a ranging control update phase (RCUP). Each phase is described below.

RCP: A phase in which the controller device transmits an RCM. The RCM of the OWR procedure may also be referred to as a poll message.

RRP: A phase in which the responder device(s) transmits a ranging response message (RRM) to the initiator device.

MRP: A phase in which devices participating in ranging exchange ranging measurement and related service information through a measurement report (MR).

RCUP: A phase in which the controller device transmits a ranging control update message (RCUM). If present, the RCUP may be the last slot of the set of ranging rounds designated by the RCM.

Referring to (a) and (c) of FIG. 7, a ranging procedure (TWR procedure) using the TWR scheme may include at least one phase for exchanging ranging messages.

Referring to (b) of FIG. 7, the TWR procedure may include an RCP, an RIP, an RRP, an MRP, and/or an RCUP.

Each phase is described below.

RCP: A phase in which the controller device transmits an RCM.

RIP: A phase in which the initiator device(s) transmits a ranging initiation message (RIM) to the responder device(s).

RRP: A phase in which the responder device(s) transmits an RRM to the initiator device.

MRP: A phase in which devices participating in ranging exchange ranging measurement and related service information through an MR.

RCUP: A phase in which the controller device transmits an RCUM. If present, the RCUP may be the last slot of the set of ranging rounds designated by the RCM.

A phase including the RIP and the RRP may be referred to as a ranging phase (RP).

Meanwhile, as in (c) of FIG. 7, in the SS-TWR procedure, the RCP and the RIP may be merged into a single phase. For example, when one electronic device serves both as an initiator device and as a controller device, the RCP and RIP may be merged into one phase. In this case, in the merged phase, one ranging message including information included in the RCM and RIM may be transmitted.

Referring to (d) of FIG. 7, a ranging procedure (TWR procedure) using the TWR scheme may include at least one phase for exchanging ranging messages. The TWR procedure may include an RCP, an RIP, an RRP, a ranging final phase (RFP), an MRP, and/or an RCUP.

Each phase is described above, with the RFP being described below:

RFP: A phase in which the initiator device transmits a ranging final message (RFM) to the responder device(s).

A phase including the RIP, RRP, and the RFP may be referred to as a ranging phase (RP).

Meanwhile, in the DS-TWR procedure, the RCP and the RIP may be merged into a single phase. For example, when one electronic device serves both as an initiator device and as a controller device, the RCP and RIP may be merged into one phase. In this case, in the merged phase, one ranging message including information included in the RCM and RIM may be transmitted.

A Many-to-Many SS-TWR/Many-to Many DS-TWR procedure will now be described.

Referring to (e) and (f) of FIG. 7, SS-TWR and DS-TWR may be performed between a plurality of initiators and a plurality of responders. In this case, unlike in (b) to (d) of FIG. 7, the RIP may include a number of ranging slots corresponding to a plurality of initiators for RIM transmission by a plurality of initiators. As an example, scheduling of ranging slots used by each initiator to transmit its own RIM in the RIP may be indicated by the RCM.

Figure 8:
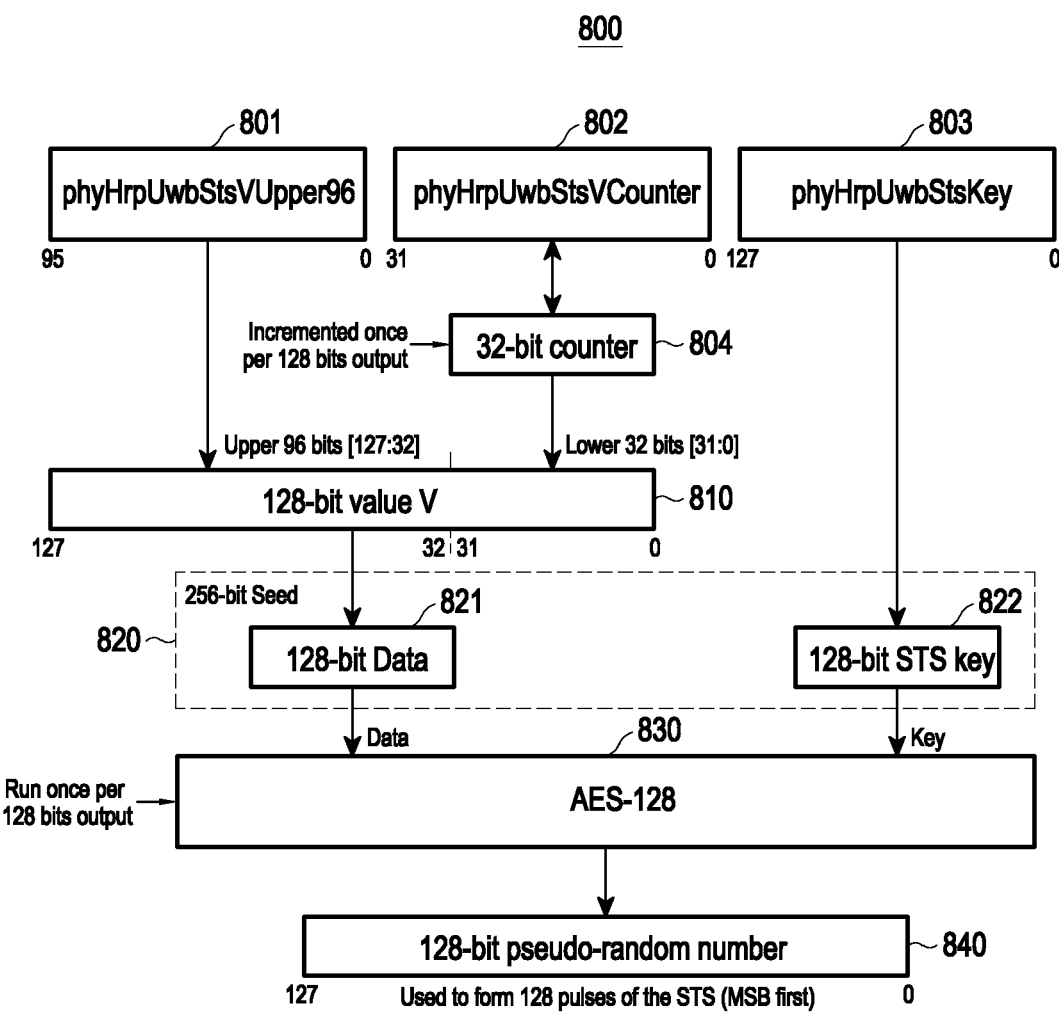
FIG. 8 illustrates a structure of a deterministic random bit generator (DRBG) for generating an STS according to an embodiment.

FIG. 8 illustrates a structure of a deterministic random bit generator (DRBG) for generating an STS according to an embodiment.

When two electronic devices perform UWB communication (UWB ranging), security of the UWB communication system should be secured to prevent disturbance to UWB ranging by an external attacker. For example, when the first electronic device and the second electronic device perform UWB ranging, a procedure for authenticating that the first electronic device and the second electronic device are mutually authorized devices is essentially required.

In an embodiment, the first electronic device and the second electronic device may perform the above-described authentication procedure through UWB security ranging. For UWB security ranging, the first electronic device and the second electronic device each may generate an STS.

For example, a different STS may be generated for each ranging slot (e.g., slots of one ranging round). For example, when generating an STS, a different STS may be generated for each slot by using the index of the slot as an input parameter (seed). Alternatively, the same STS may be generated for each ranging slot (e.g., slots in one ranging round). For example, the same STS may be generated for each slot by using the slot index fixed to 0, or a specific value upon generating an STS.

As the first electronic device (transmission device) and the second electronic device (reception device) use the same STS generation method (mechanism), and the input parameter used to generate an STS is synchronized with (e.g., rendered to be the same as) the input parameter used for the second electronic device to generate an STS, the second electronic device may generate a complementary sequence to the transmitted sequence (STS) to be able to normally receive the ranging message sent from the first electronic device. In an embodiment, the RSKD IE of FIG. 9 may be used to synchronize the input parameter (e.g., V (e.g., 810 of FIG. 8)) and an STS key (e.g., 803/821 of FIG. 8) before the electronic devices participate in the STS-applied ranging exchange.

The above-described STS may be generated using a DRBG having the structure of FIG. 8.

Referring to FIG. 8, the DRBG 800 may generate an STS based on the phyHrpUwbStsVUpper96 attribute 801, the phyHrpUwbStsVCounter attribute 802, and the phyHrpUwbStsKey attribute 803. The DRBG 800 may generate a 128-bit pseudo random number 840 representing a 128-bit random number at every repetition, and the 128-bit pseudo random number 840 may be used to form 128 pseudo randomized pulses of the STS. For example, the 128-bit pseudo random number 840 may first take and transmit the most significant bit (MSB), and each bit with a value of 0 may generate a positive polarity pulse, and each bit with a value of 1 may generate a negative polarity pulse. The so-generated STS may be included in a set number of STS segments.

Specifically, the DRBG 800 may generate a seed 820 indicating information necessary to generate an STS and generate an STS based on the seed 820. For example, the DRBG 800 may use an advanced encryption standard 128 (AES-128) algorithm 830 as an algorithm for generating an STS based on the seed 820.

Only valid electronic devices may know the value of the correct seed 820. The seed 820 may include a 128-bit value V 810 representing 128-bit data 821 for STS generation and a phyHrpUwbStsKey 803 representing a 128-bit STS key 822. As an example, the phyHrpUwbStsKey 803 may be set to a different value depending on whether a dynamic STS or fixed STS is generated.

The DRBG 800 may generate a 128-bit pseudo random number 840 using the 128-bit value V 810 and the phyHrpUwbStsKey 803 as input values to the AES-128 algorithm 830. An STS may be generated based on the 128-bit pseudo random number 840.

The 128-bit value V 810 may include a 32-bit phyHrpUwbStsVCounter 802 and a 96-bit phyHrpUwbStsVUpper96 801.

The phyHrpUwbStsVUpper96 801 may correspond to upper 96 bits of the 128-bit value V 810, and the phyHrpUwbStsVCounter 802 may correspond to lower 32 bits of the 128-bit value V 810. The phyHrpUwbStsVCounter 802 and the phyHrpUwbStsVUpper96 801 may be set to a different value depending on whether a dynamic STS or fixed STS is generated. Whenever a 128-bit pseudo random number 840 is output, that is, every repetition of the DRBG 800, the 32 bit counter 804 may increase the value of the phyHrpUwbStsVCounter 802.

When generating a subsequent STS, the DRBG 800 may use the phyHrpUwbStsVCounter 802 including a value increased from the value used to generate the current STS as an input to the AES-128 algorithm 830.

In an embodiment, the first electronic device and the second electronic device may perform STS generation. Generation of the STS may be performed by both the first electronic device and the second electronic device. FIG. 8 illustrates an example in which the electronic device generates an STS using phyHrpUwbStsVUpper96 801, phyHrpUwbStsVCounter 802, and phyHrpUwbStsKey 803 as inputs of the DRBG. However, the terms used for the parameters are not limited to the example shown in FIG. 8 and are merely names for distinguishing the parameters, and configurations that perform the same function even when they have different names do not deviate from the scope of the disclosure.

FIG. 9 illustrates an RSKD IE according to an embodiment.

The RSKD IE may be used to carry and align seeds for STS generation (e.g., STS key and data). The RSKD IE may be a Header IE and/or a Payload IE of the UWB MAC frame.

Referring to FIG. 9, the content fields of the RSKD IE may include a V3P field, a V2P field, a V1P field, a VCP field, an SKP field, an ACP field, a CP field, a V3 field, a V2 field, a V1 field, a V Counter field, an STS Key field, and/or an Application Code field. Each field is described below.

The V3P field may indicate whether the V3 field exists. For example, 1 may indicate the presence of the V3 field, and 0 may indicate the absence of the V3 field.

The V2P field may indicate whether the V2 field exists. For example, 1 may indicate the presence of the V2 field, and 0 may indicate the absence of the V2 field.

The V1P field may indicate whether the V1 field exists. For example, 1 may indicate the existence of the V1 field, and 0 may indicate the absence of the V1 field.

The VCP field may indicate whether the V Counter field exists. For example, 1 may indicate the presence of the V Counter field, and 0 may indicate the absence of the V Counter field.

The SKP field may indicate whether the STS Key field exists. For example, 1 may indicate the presence of the STS Key field, and 0 may indicate the absence of the STS Key field.

The ACP field may indicate whether the Application Code field exists. For example, 0 may indicate the absence of the Application Code field, 1 may indicate the presence of the 4-octet Application Code field, 2 may indicate the presence of the 8-octet Application Code field, and 3 may indicate the presence of the 16-octet Application Code field.

The CP field may indicate whether the V Counter field (if present) is applied to the current packet. For example, 1 may indicate that the V Counter field (if present) applies to the current packet, and 0 may indicate whether the RSKD IE applies to future packet exchange.

The V3 field includes a 4-octet string for setting 96 to 127 bits of STS generation data.

The V2 field includes a 4-octet string for setting 64 to 95 bits of STS generation data.

The V1 field includes a 4-octet string for setting 32 to 63 bits of STS generation data.

The V Counter field includes a 4-octet string for setting the counter portion of STS generation data. As such, V (e.g., 810 in FIG. 8) used as input (data) for generating the STS may be fragmented and transmitted in units of 4 octets (32 bits) depending on whether it includes the V3 field, V2 field, and/or V1 field.

The V Counter field, V1, V2 and V3 fields may be fragmented and transmitted to facilitate synchronization between ranging nodes (devices).

The STS Key field includes a 16-octet string for initializing the STS key.

The Application Code field may provide a mechanism for the next higher layer to transfer additional application specific information related to the IE content. The Application Code field may be defined by the higher layer.

The fields of the RSKD IE may be determined and consumed by the higher layer. The next higher layer may verify the same as necessary and set the phyHrpUwbStsKey, phyHrpUwbStsVUpper96, and phyHrpUwbStsVCounter attributes.

The STS Key field, and the V1, V2, V3, and V Counter fields which together define the seed for STS generation are strings of octets, and any arbitrary string may generally be transmitted in octet order. For example, the first received octet may be treated as the most significant octet.

The Federal Communications Commission (FCC) defines wireless communication technology that uses a bandwidth of 500 MHz or more or whose bandwidth corresponding to the center frequency is 20% or more as UWB and restricts the mean effective isotropically radiated power (EIRP) to −41.3 dBm/MHz and Peak EIRP to 0 dBm/50 MHz.

The EIRP restrictions pose limitations to UWB transmit power. For example, to meet the FCC regulations, an average of −41.3 dBm/MHz should be met for 1 ms (test period). Meanwhile, as the length of the packet (UWB PHY packet/transport packet) increases, transmit power per UWB pulse, which is the unit of the UWB signal, decreases. As the length of the packet (UWB PHY packet) decreases, the transmit power per UWB pulse increases. Recently, as the frequency band of WiFi has been extended to 6 GHz, UWB signals (UWB pulses) having relatively low transmit power become vulnerable to interference. The UWB PHY packet may be referred to as a transport packet, packet, or PHY packet.

Therefore, to enhance reception performance of UWB signals, it is necessary to consider a method for increasing transmit power per UWB pulse by minimizing/optimizing the length of the packet. Hereinafter, various embodiments of a new transport packet (UWB PHY packet) format for transmission (fragmented transmission) of fragmented packets and a transmission method for fragmented packets based on the new format of packets are described with reference to the drawings.

Figure 10:
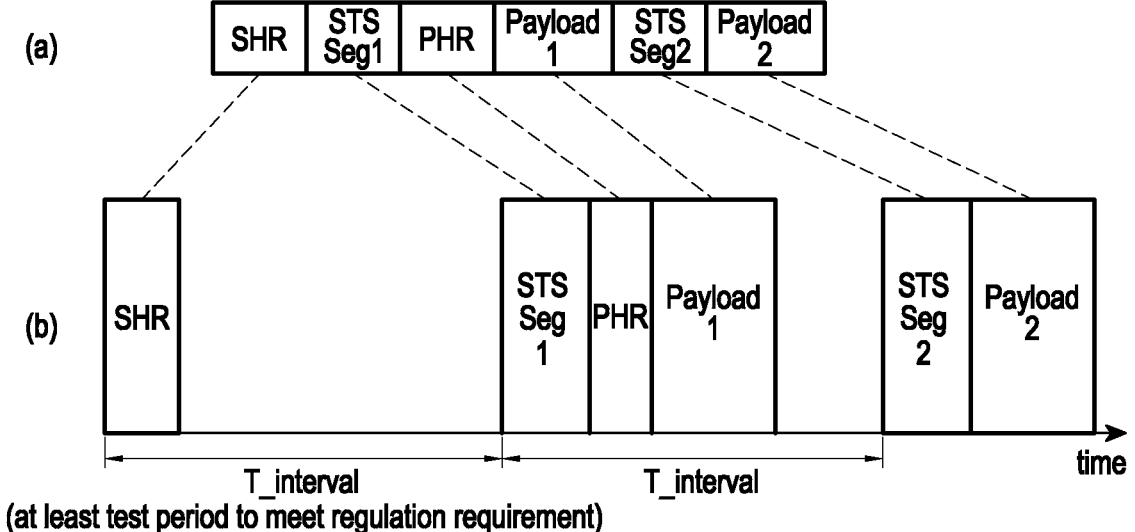
FIG. 10 illustrates a transport packet format for transmission of a fragmented packet and a transmission method of a fragmented packet according to an embodiment.

FIG. 10 illustrates a transport packet format for transmission of a fragmented packet and a transmission method of a fragmented packet according to an embodiment.

Referring to FIG. 10, the transport packet may be a UWB PHY packet of a new format defined for transmission of a fragmented packet. In other words, a new packet format may be defined for fragmented transmission (fragmentation transmission).

A plurality of STS fields may be used to fragment and transmit a transport packet. For example, the STS field may be included in the front of the fragmented part (fragmented payload) of the PHR and payload. Thus, the STS field may be included in the front of the fragmented packet.

Each STS field (part) may have the same code configuration or a different code configuration.

Meanwhile, the STS corresponds to a known pattern/sequence between two electronic devices performing UWB communication. Thus, STS may be used for synchronization. Further, STS corresponds to private code (data). Therefore, STS may be used for secure ranging and authentication.

Therefore, by adding the STS in the front of each fragmented part (packet) and transmitting it, it is possible 1) to help synchronization before reception of the fragmented part, 2) to enable secure ranging every reception of the fragmented part, and 3) to allow the reception device to identify whether the fragmented part is one transmitted from an appropriate device.

Accordingly, when the STS is used for fragmented transmission, it is not necessary to newly generate separate synchronization information and add it to each fragmented part. Since the STS corresponds to a private code, secure communication is possible for each fragmented part. Further, it is possible to enhance security by configuring each STS to differ to increase the entire STS length.

The information for fragmented transmission and/or the STS configuration information for STS generation may be exchanged between the electronic devices. For example, the electronic device transmitting the transport packet may transmit information for fragmented transmission and/or STS configuration information for STS generation to the electronic device receiving the transport packet. The STS configuration information may be transmitted through the RSKD IE (e.g., the RSKE IE of FIG. 9).

The information for fragmented transmission may include at least one of the packet configuration information (e.g., STS packet configuration information) of the transport packet or information about the number of fragmented packets. The information for fragmented transmission may be transmitted through the NB channel, the UWB channel, or the OOB channel.

The STS configuration information may include first STS configuration information for generating the STS (first type STS) used for normal transmission or fragmented transmission and/or second STS configuration information for generating the STS (second type STS) used only for fragmented transmission. The first STS configuration information may be transmitted through the NB channel, the UWB channel, or the OOB channel. The second STS configuration information may be transmitted through the NB channel.

The first STS configuration information may include at least one of the STS generation data or STS key used for generating the first type STS. The second STS configuration information may include at least one of the STS generation data, STS key, or STS index information used for generating the STS, used for generating the second type STS.

The STS generation data may be transmitted through the V3 field, V2 field, V1 field, and/or V Counter field of the RSKD IE (e.g., the RSKE IE of FIG. 9). The STS generation data may include the whole or part of the data (e.g., the V value (e.g., V 810 of FIG. 8) of the DRBG) for STS generation.

The STS key may be transmitted through the STS Key field of the RSKD IE (e.g., the RSKD IE of FIG. 9). The STS generation data and the STS key may be used as seeds (e.g., the seed 820 of FIG. 8) used for generating the STS.

The STS index information may include, e.g., the index value for the STS field (or STS) included in the fragmented packet. For example, the STS index information may include the index value for each of the STS fields (or STS) included in each fragmented packet. For example, the index values for the STS fields (or STSs) may be set as sequentially incrementing or decrementing values. Alternatively, the STS index may be set to a fixed value. The STS index information may be transmitted through the RSKD IE or a separate IE (IE of the UWB MAC frame). The STS index may be used as one of the input parameters used for generating the STS.

Referring to (a) of FIG. 10, a transport packet may include an SHR field, a PHY header (PHR) field, a plurality of fragmented payloads, and/or a plurality of STS fields. In the disclosure, the SHR field may be simply referred to as SHR, and the PHR field may be simply referred to as PHR.

As illustrated in (a) of FIG. 10, one STS field among the plurality of STS fields may be included between the SHR and the PHR. For example, a first STS field (STS Seg1) may be included in the same position as the STS field of the UWB PHY packet (e.g., the SP1 packet in (b) of FIG. 5) having STS packet configuration 1 (SP1).

Another STS field among the plurality of fields may be included between fragmented payloads. For example, a second STS field (STS Seg2) may be included between the first fragmented payload (Payload1) and the second fragmented payload (Payload2).

The plurality of fragmented payloads included in the transport packet may include one UWB MAC frame. In other words, the whole data of one UWB MAC frame may be included in one payload. One payload may be fragmented into multiple fragmented payloads. The plurality of fragmented payloads may have the same or different lengths. However, the embodiments are not limited thereto. The mapping relationship between the UWB MAC frame and the fragmented payload may be configured in various ways according to settings.

Referring to (b) of FIG. 10, a transport packet may be fragmented into a plurality of fragmented parts and transmitted. The transport packet may be fragmented into an SHR and a plurality of fragmented packets. For example, the plurality of fragmented packets may include a first fragmented packet including a first STS field (STS Seg1), a PHR and a first fragmented payload (Payload1) and a second fragmented packet including a second STS field (STS Seg2) and a second fragmented payload (Payload2).

Each fragmented part/packet may be transmitted through a preset channel (e.g., a UWB channel) with a preset transmission interval (T_interval). For example, the SHR may be transmitted within the first transmission period, the first fragmented packet may be transmitted within the second transmission period, and the second fragmented packet may be transmitted within the third transmission period. In this case, the interval (first interval) between the start time of the first transmission period and the start time of the second transmission period and the interval (second interval) between the start time of the second transmission period and the start time of the third transmission period may be the same interval (T_interval).

The transmission interval should be longer than, at least, the test period (e.g., 1 ms) to meet regulatory requirements.

Meanwhile, as shown in (a) of FIG. 10, the structure of a transport packet having two fragmented payloads and the transmission of the fragmented packet based on the transport packet is provided for convenience of description, but the technical spirit of the disclosure is not limited thereto. For example, the number of fragmented payloads may be three or more. In this case, each STS field may be included between two fragmented payloads, and each fragmented payload may be included in a separate fragmented packet.

For example, when the number of fragmented payloads is 3, the second STS field (STS Seg2) may be included between the first fragmented payload (Payload1) and the second fragmented payload (Payload2), and the third STS field (STS Seg3) may be included between the second fragmented payload (Payload2) and a third fragmented payload (Payload3). In this case, the transport packet may be fragmented into an SHR and three fragmented packets. The three fragmented packets may include a first fragmented packet including a first STS field (STS Seg1), a PHR, and a first fragmented payload (Payload1), a second fragmented packet including a second STS field (STS Seg2) and a second fragmented payload (Payload2), and a third fragmented packet including a third STS field (STS Seg3) and a third fragmented payload (Payload3).

In FIG. 10, the SHR and the PHR are transmitted through a UWB channel. However, a transmission of the SHR and/or the PHR through a UWB channel may be omitted according to certain embodiments.

For example, when information for synchronization (or, all or part of the information included in the SHR) is transmitted through the NB channel, the SHR may not be transmitted through the UWB channel.

In another example, when information required for reception of the STS and/or payload (or all or part of the information included in the PHR) is transmitted through an NB channel and/or an OOB channel (e.g., a BIE channel), the PHR may not be transmitted through the UWB channel. For example, unlike in FIG. 10, the PHR may not be included in the first fragmented packet transmitted through the UWB channel (i.e., the PHR may not be included between the first STS field and the first fragmented payload (Payload 1) of the first fragmented packet).

First Embodiment

The first embodiment corresponds to an embodiment in which STSs for a plurality of fragmented payloads are set to the same value. In the first embodiment, as many same STSs as the number of fragmented payloads may be generated to be used to transmit the fragmented payloads (or fragmented packets including the fragmented payloads). For example, the STS field including the same STS may be included in the front of each fragmented packet to be used to transmit the fragmented packet. The STS may be an STS configured with the same value as the STS of the packet having a legacy packet format (e.g., an SP1 packet, an SP2 packet, or an SP3 packet in (b) of FIG. 5). The packet format (configuration) of the transport packet according to the first embodiment may be referred to as a first packet format (configuration) and a first fragmented transmission packet format (configuration).

Information for fragmented transmission and/or first STS configuration information for generation of the first type STS may be exchanged between electronic devices. For example, the electronic device transmitting the transport packet may transmit information for fragmented transmission and/or first STS configuration information for generation of the first type STS to the electronic device receiving the transport packet. For a description of the information for fragmented transmission and the first STS configuration information, the description of FIG. 10 is referenced.

Figure 11A:
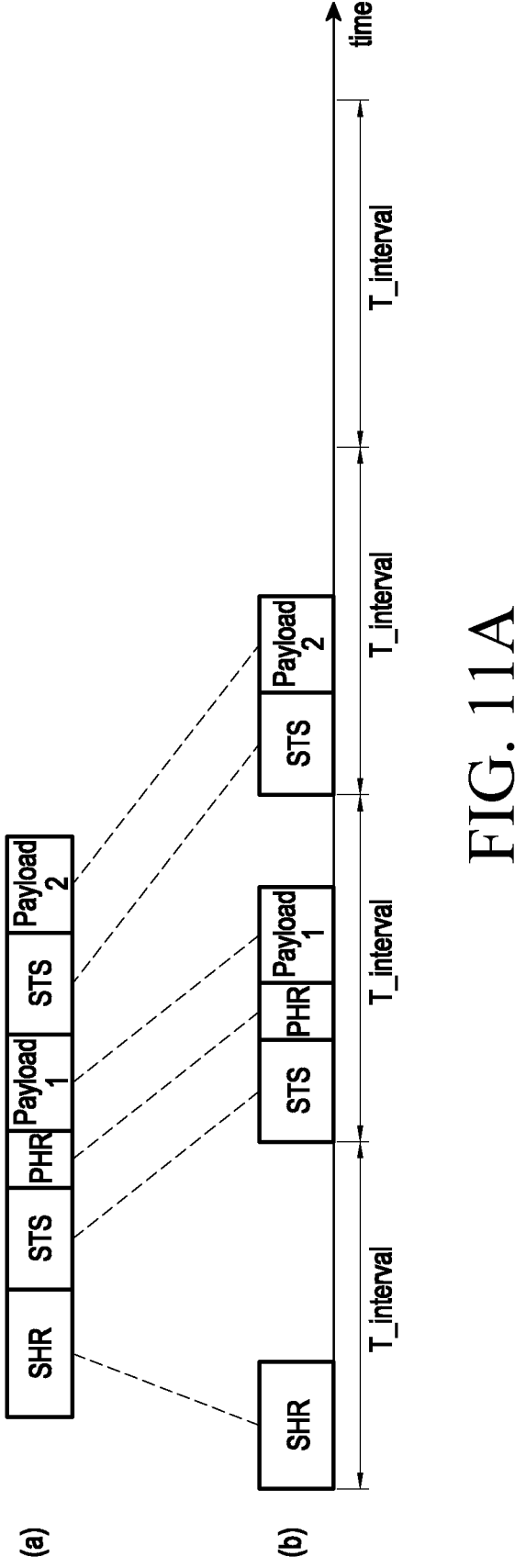
FIG. 11A illustrates a structure of a transport packet for transmission of a fragmented packet and a transmission method of a fragmented packet according to a first embodiment.

FIG. 11A illustrates a structure of a transport packet for transmission of a fragmented packet and a transmission method of a fragmented packet according to a first embodiment. The embodiment of FIG. 11A assumes that the transport packet includes two fragmented payloads for convenience of description.

Referring to (a) of FIG. 11A, a transport packet may include an SHR field, a PHR, a plurality of fragmented payloads, and/or a plurality of STS fields.

The plurality of STS fields may include a first STS field positioned between the SHR and PHR and a second STS field positioned between a first fragmented payload and a second fragmented payload. The first STS field and the second STS field may include the same STS.

The STS in the first STS field and the second STS field may be an STS configured with the same value as the STS of the packet having a legacy packet format (e.g., an SP1 packet, an SP2 packet, or an SP3 packet in (b) of FIG. 5). For example, the STS may be an STS generated based on previously shared first STS configuration information.

The transport packet (or fragmented packet) may be generated from the SP1 packet (e.g., the SP1 packet in (b) of FIG. 5). In this case, the payload of the SP1 packet may be fragmented into a plurality of fragmented payloads (e.g., two fragmented payloads) according to settings. The STS values included in the first STS field and the second STS field may be set to the same value as the STS value of the SP1 packet. For example, the STS of the SP1 packet may be set to the STS of the first STS field. The STS of the SP1 packet may be copied and set as the STS of the second STS field.

Referring to (b) of FIG. 11A, the transport packet may be fragmented into an SHR and a plurality of fragmented packets. The plurality of fragmented packets may include, e.g., a first fragmented packet including a first STS field, a PHR and a first fragmented payload, and a second fragmented packet including a second STS field and a second fragmented payload.

Each fragmented part (e.g., SHR, first fragmented packet and second fragmented packet) may be transmitted through the UWB channel at a preset transmission interval (T_interval).

In FIG. 11A, the SHR and the PHR are transmitted through a UWB channel. However, a transmission of the SHR and/or the PHR through a UWB channel may be omitted according to certain embodiments.

For example, when information for synchronization (or, all or part of the information included in the SHR) is transmitted through the NB channel, the SHR may not be transmitted through the UWB channel.

In another example, when information required for reception of the STS and/or payload (or all or part of the information included in the PHR) is transmitted through an NB channel and/or an OOB channel (e.g., a BIE channel), the PHR may not be transmitted through the UWB channel. Unlike in FIG. 11A, the PHR may not be included in the first fragmented packet transmitted through the UWB channel (i.e., the PHR may not be included between the first STS field and the first fragmented payload (Payload 1) of the first fragmented packet).

Figure 11B:
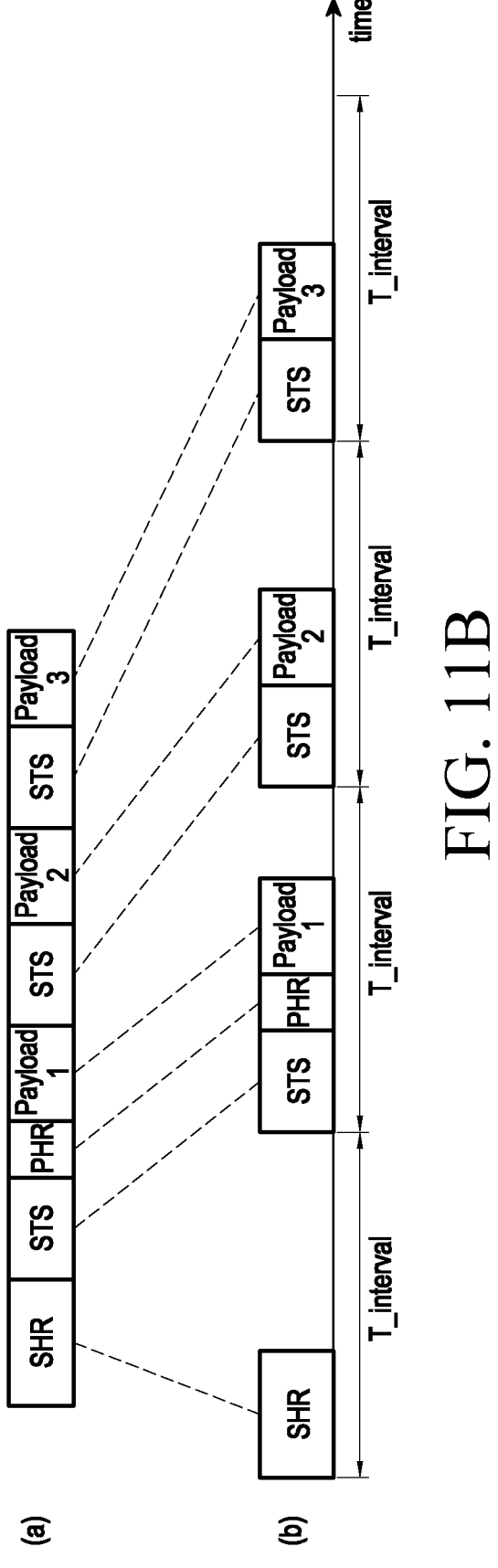
FIG. 11B illustrates another structure of a transport packet for transmission of a fragmented packet and a transmission method of a fragmented packet according to the first embodiment.

FIG. 11B illustrates another structure of a transport packet for transmission of a fragmented packet and a transmission method of a fragmented packet according to the first embodiment.

The embodiment of FIG. 11B assumes that the transport packet includes three fragmented payloads for convenience of description.

Referring to (a) of FIG. 11B, a transport packet may include an SHR field, a PHR, a plurality of fragmented payloads, and/or a plurality of STS fields.

The plurality of STS fields may include a first STS field positioned between the SHR and the PHR, a second STS field positioned between the first fragmented payload and the second fragmented payload, and a third STS field positioned between the second fragmented payload and the third fragmented payload. The first STS field, the second STS field, and the third STS field may include the same STS.

The STS in the first STS field, the second STS field, and the third STS field may be an STS configured with the same value as the STS of the packet having a legacy packet format (e.g., an SP1 packet, an SP2 packet, or an SP3 packet in (b) of FIG. 5). For example, the STS may be an STS generated based on previously shared first STS configuration information.

The transport packet may be generated from the SP1 packet (e.g., the SP1 packet in (b) of FIG. 5). In this case, the payload of the SP1 packet may be fragmented into a plurality of fragmented payloads (e.g., three fragmented payloads) according to settings. The STS values included in the first STS field, the second STS field, and the third STS field may be set to the same value as the STS value of the SP1 packet. For example, the STS of the SP1 packet may be set to the STS of the first STS field. The STS of the SP1 packet may be copied and set as the STSs of the second STS field and the third STS field.

Referring to (b) of FIG. 11B, the transport packet may be fragmented into an SHR and a plurality of fragmented packets. The plurality of fragmented packets may include, e.g., a first fragmented packet including a first STS field, a PHR and a first fragmented payload, a second fragmented packet including a second STS field and a second fragmented payload, and a third fragmented packet including a third STS field and a third fragmented payload.

Each fragmented part (e.g., SHR, first fragmented packet, second fragmented packet, and third fragmented packet) may be transmitted through the UWB channel at a preset transmission interval (T_interval).

In FIG. 11B, the SHR and the PHR are transmitted through a UWB channel. However, a transmission of the SHR and/or the PHR through a UWB channel may be omitted according to certain embodiments.

For example, when information for synchronization (or, all or part of the information included in the SHR) is transmitted through the NB channel, the SHR may not be transmitted through the UWB channel.

In another example, when information required for reception of the STS and/or payload (or all or part of the information included in the PHR) is transmitted through an NB channel and/or an OOB channel (e.g., a BIE channel), the PHR may not be transmitted through the UWB channel. Unlike in FIG. 11B, the PHR may not be included in the first fragmented packet transmitted through the UWB channel (i.e., the PHR may not be included between the first STS field and the first fragmented payload (Payload 1) of the first fragmented packet).

Figure 11C:
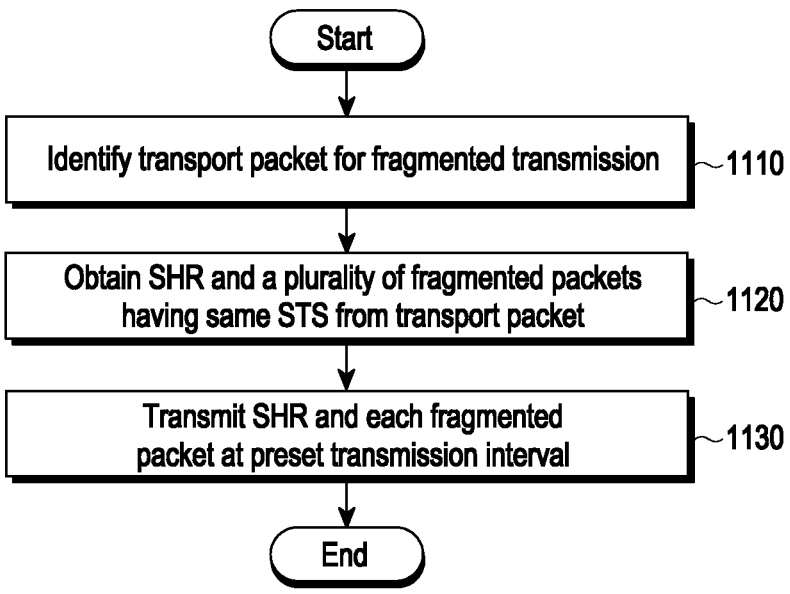
FIG. 11C illustrates a method in which an electronic device transmits a fragmented packet to another electronic device according to the first embodiment.

FIG. 11C illustrates a method in which an electronic device transmits a fragmented packet to another electronic device according to the first embodiment.

In step 1110, the electronic device identifies a transport packet for fragmented transmission. The transport packet may be a UWB PHY packet including data of a ranging message (e.g., RIM, RRM, RFM, etc.) for UWB ranging or data for other purposes (e.g., advertisement message data, service data, etc.). For example, if the transport packet is for a ranging message, the transport packet including the ranging message may be transmitted/received through the message exchange procedure of FIG. 7.

The transport packet may be a transport packet having the structure shown in FIGS. 11A(a) and 11B(a). In another embodiment, the transport packet may be an SP1 packet (e.g., the SP1 packet in (b) of FIG. 5).

Before step 1110, the electronic device may transmit configuration information (control information) for fragmented transmission to another electronic device. The electronic device may transmit information for fragmented transmission and/or first STS configuration information for generation of the first type STS. For a description of the information for fragmented transmission and the first STS configuration information, the description of FIG. 10 is referenced.

In step 1120, the electronic device obtains the SHR and/or the plurality of fragmented packets having the same STS from the transport packet. The plurality of fragmented packets having the same STS may include the first fragmented packet and the second fragmented packet shown in (b) of FIG. 11A or the first fragmented packet, the second fragmented packet, and the third fragmented packet shown in (b) of FIG. 11B.

In step 1130, the electronic device transmits the SHR and/or each fragmented packet at a preset transmission interval (T_interval) through, e.g., a UWB channel.

Second Embodiment

The second embodiment corresponds to an embodiment in which STSs for a plurality of fragmented payloads are set to different values. In the second embodiment, the STS for the fragmented payload (first fragmented payload) included in the first fragmented packet and the STS for another fragmented payload may be set to different values. For example, the STS field including a first STS may be included in the front of the first fragmented packet, and the STS field including a second STS different from the first STS may be included in the front of the subsequent fragmented packet. The first STS may be an STS configured with the same value as the STS of a packet having the legacy packet format (e.g., the SP1 packet, SP2 packet or SP3 packet in (b) of FIG. 5). The second STS may be an STS configured with a different value from the STS of the packet having the legacy packet format (e.g., SP1 packet, SP2 packet or SP3 packet in (b) of FIG. 5). In the disclosure, the packet format (configuration) of the transport packet according to the second embodiment may be referred to as a second packet format (configuration) and a second fragmented transmission packet format (configuration).

Information for fragmented transmission and/or first STS configuration information for generation of the first type STS may be exchanged between electronic devices. For example, the electronic device transmitting the transport packet may transmit information for fragmented transmission and/or first STS configuration information for generation of the first type STS to the electronic device receiving the transport packet. For a description of the information for fragmented transmission and the first STS configuration information, the description of FIG. 10 is referenced.

Figure 12A:
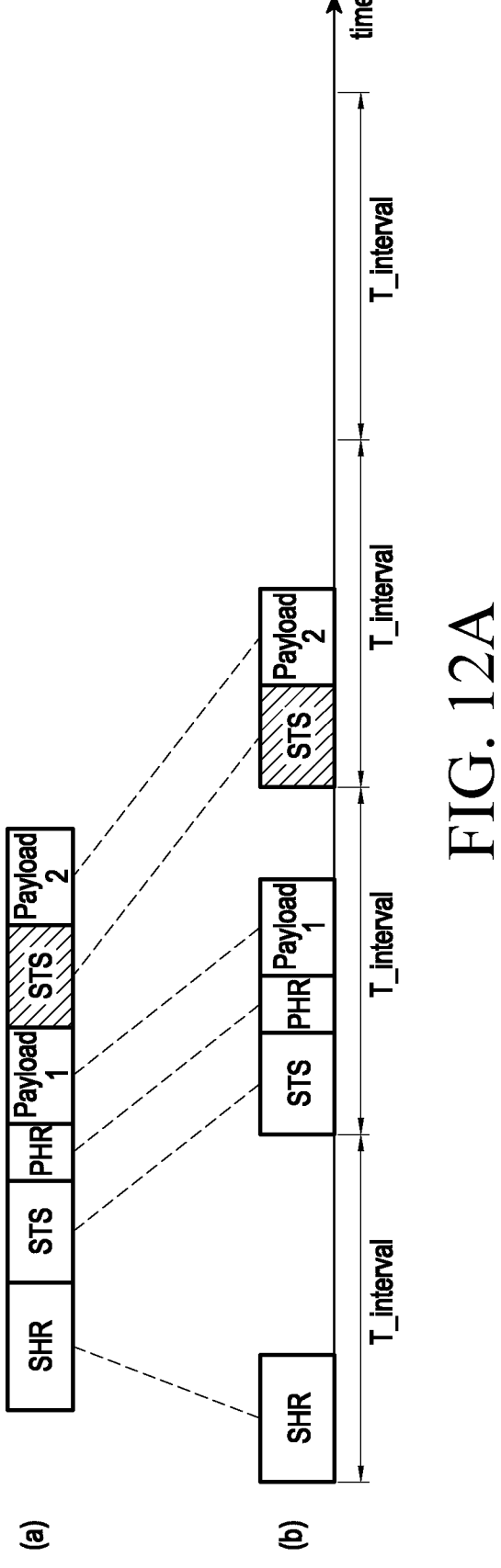
FIG. 12A illustrates a structure of a transport packet for transmission of a fragmented packet and a transmission method of a fragmented packet according to a second embodiment.

FIG. 12A illustrates a structure of a transport packet for transmission of a fragmented packet and a transmission method of a fragmented packet according to a second embodiment. The embodiment of FIG. 12A assumes that the transport packet includes two fragmented payloads for convenience of description.

Referring to (a) of FIG. 12A, a transport packet may include an SHR field, a PHR, a plurality of fragmented payloads, and/or a plurality of STS fields.

The plurality of STS fields may include a first STS field positioned between the SHR and PHR and a second STS field positioned between a first fragmented payload and a second fragmented payload. The first STS field and the second STS field may include different STSs.

The STS of the first STS field may be an STS configured with the same value as the STS used in the legacy SP packet (e.g., the SP1 packet, SP2 packet or SP3 packet in (b) of FIG. 5). The STS of the second STS field may be an STS configured with a different value from the STS used in the legacy packet (e.g., SP1 packet, SP2 packet or SP3 packet in (b) of FIG. 5). For example, the STS of the first STS field may be an STS generated based on pre-shared first STS configuration information, and the STS of the second STS field may be an STS generated based on the pre-shared first STS configuration information and an additional parameter (e.g., STS index or slot index). As an example, the additional parameter may be previously exchanged between electronic devices.

The transport packet (or fragmented packet) may be generated from the SP1 packet (e.g., the SP1 packet in (b) of FIG. 5). In this case, the payload of the SP1 packet may be fragmented into a plurality of fragmented payloads (e.g., two fragmented payloads) according to settings. Further, the STS included in the first STS field may be set to the same value as the STS of the SP1 packet. The STS included in the second STS field may be set to a newly set STS value different from the STS of the SP1 packet.

Referring to (b) of FIG. 12A, the transport packet may be fragmented into an SHR and a plurality of fragmented packets. The plurality of fragmented packets may include, e.g., a first fragmented packet including a first STS field, a PHR and a first fragmented payload, and a second fragmented packet including a second STS field and a second fragmented payload.

Each fragmented part (e.g., SHR, first fragmented packet and second fragmented packet) may be transmitted through the UWB channel at a preset transmission interval (T_interval).

In FIG. 12A, the SHR and the PHR are transmitted through a UWB channel. However, a transmission of the SHR and/or the PHR through a UWB channel may be omitted according to certain embodiments.

For example, when information for synchronization (or, all or part of the information included in the SHR) is transmitted through the NB channel, the SHR may not be transmitted through the UWB channel.

In another example, when information required for reception of the STS and/or payload (or all or part of the information included in the PHR) is transmitted through an NB channel and/or an OOB channel (e.g., a BIE channel), the PHR may not be transmitted through the UWB channel. Unlike in FIG. 12A, the PHR may not be included in the first fragmented packet transmitted through the UWB channel (i.e., the PHR may not be included between the first STS field and the first fragmented payload (Payload 1) of the first fragmented packet).

Figure 12B:
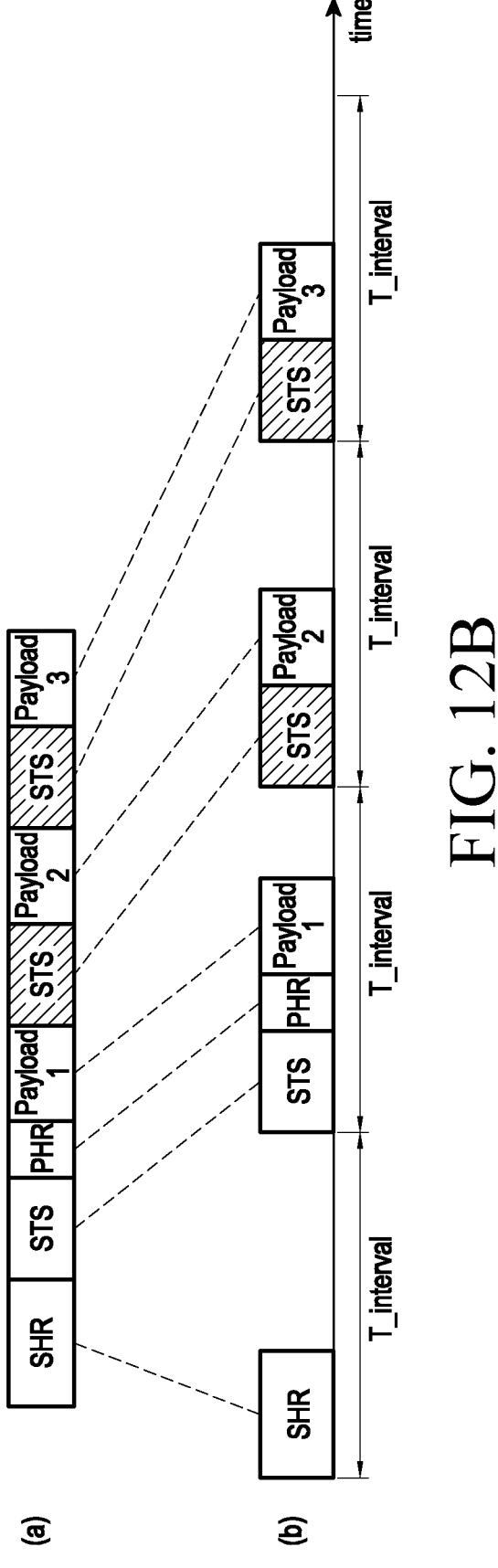
FIG. 12B illustrates another structure of a transport packet for transmission of a fragmented packet and a transmission method of a fragmented packet according to the second embodiment.

FIG. 12B illustrates another structure of a transport packet for transmission of a fragmented packet and a transmission method of a fragmented packet according to the second embodiment. The embodiment of FIG. 12B assumes that the transport packet includes three fragmented payloads for convenience of description.

Referring to (a) of FIG. 12B, a transport packet may include an SHR field, a PHR, a plurality of fragmented payloads, and/or a plurality of STS fields.

The plurality of STS fields may include a first STS field positioned between the SHR and the PHR, a second STS field positioned between the first fragmented payload and the second fragmented payload, and a third STS field positioned between the second fragmented payload and the third fragmented payload.

In the embodiment of FIG. 12B, similar to the embodiment of FIG. 12A, the first STS field may include a different STS from the second and third STS fields that follow. In the embodiment of FIG. 12B, the second STS field and the third STS field may include the same STS.

As an embodiment, the STS of the first STS field may be an STS configured with the same value as the STS used in the legacy SP packet (e.g., the SP1 packet, SP2 packet or SP3 packet in (b) of FIG. 5). The STSs of the second STS field and the third STS field may be STSs configured with different values from the STS used in the legacy packet (e.g., SP1 packet, SP2 packet or SP3 packet in (b) of FIG. 5). For example, the STS of the first STS field may be an STS generated based on pre-shared first STS configuration information, and the STSs of the second STS field and the third STS field may be STSs generated based on the pre-shared first STS configuration information and the same additional parameter (e.g., STS index set as the same value).

The transport packet (or fragmented packet) may be generated from the SP1 packet (e.g., the SP1 packet in (b) of FIG. 5). In this case, the payload of the SP1 packet may be fragmented into a plurality of fragmented payloads (e.g., three fragmented payloads) according to settings. Further, the STS included in the first STS field may be set to the same value as the STS of the SP1 packet. The STSs included in the second STS field and the third STS field may be set to newly set STS values different from the STS of the SP1 packet.

Referring to (b) of FIG. 12B, the transport packet may be fragmented into an SHR and a plurality of fragmented packets. The plurality of fragmented packets may include, e.g., a first fragmented packet including a first STS field, a PHR and a first fragmented payload, a second fragmented packet including a second STS field and a second fragmented payload, and a third fragmented packet including a third STS field and a third fragmented payload.

Each fragmented part (e.g., SHR, first fragmented packet, second fragmented packet, and third fragmented packet) may be transmitted through the UWB channel at a preset transmission interval (T_interval).

In FIG. 12B, the SHR and the PHR are transmitted through a UWB channel. However, a transmission of the SHR and/or the PHR through a UWB channel may be omitted according to embodiments.

For example, when information for synchronization (or, all or part of the information included in the SHR) is transmitted through the NB channel, the SHR may not be transmitted through the UWB channel.

In another example, when information required for reception of the STS and/or payload (or all or part of the information included in the PHR) is transmitted through an NB channel and/or an OOB channel (e.g., a BIE channel), the PHR may not be transmitted through the UWB channel. Unlike in FIG. 12B, the PHR may not be included in the first fragmented packet transmitted through the UWB channel (i.e., the PHR may not be included between the first STS field and the first fragmented payload (Payload 1) of the first fragmented packet).

Figure 12C:
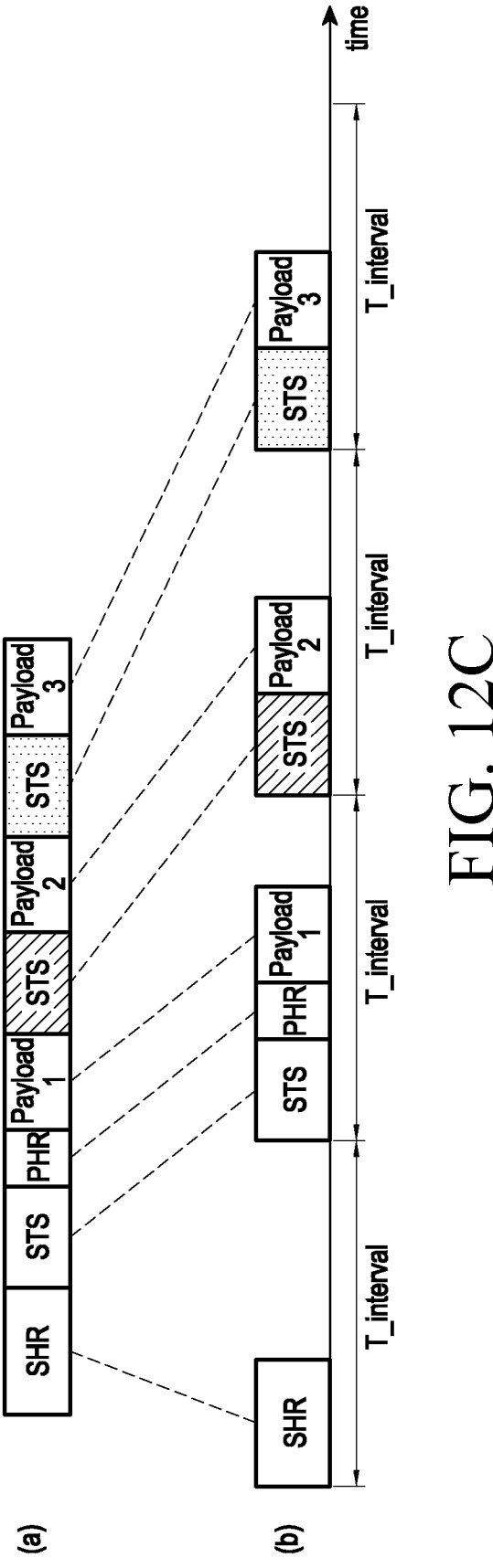
FIG. 12C illustrates another structure of a transport packet for transmission of a fragmented packet and a transmission method of a fragmented packet according to the second embodiment.

FIG. 12C illustrates another structure of a transport packet for transmission of a fragmented packet and a transmission method of a fragmented packet according to the second embodiment. The embodiment of FIG. 12C assumes that the transport packet includes three fragmented payloads for convenience of description.

Referring to (a) of FIG. 12C, a transport packet may include an SHR field, a PHR, a plurality of fragmented payloads, and/or a plurality of STS fields.

The plurality of STS fields may include a first STS field positioned between the SHR and the PHR, a second STS field positioned between the first fragmented payload and the second fragmented payload, and a third STS field positioned between the second fragmented payload and the third fragmented payload.

In the embodiment of FIG. 12C, similar to the embodiment of FIG. 12A, the first STS field may include a different STS from the second and third STS fields that follow. In the embodiment of FIG. 12C, unlike the embodiment of FIG. 12B, the second STS field and the third STS field may include different STSs.

The STS values per fragmented packet/payload may be set to different values according to a preset rule (e.g., increment/decrement in STS index). For example, the STS index (e.g., 2) of the second STS field may be set to be larger than the STS index (e.g., 1) of the first STS field, and the STS index (e.g., 3) of the third STS field may be set to be larger than the STS index (e.g., 2) of the second STS field. As the STS index set in such a manner is used as an input value (parameter) for generating the STS of the fragmented packet, the respective STS values of the fragmented packets all may be set to different values.

The STS of the first STS field may be an STS configured with the same value as the STS used in the legacy SP packet (e.g., the SP1 packet, SP2 packet or SP3 packet in (b) of FIG. 5). The STSs of the second STS field and the third STS field may be STSs configured with different values from the STS used in the legacy packet (e.g., SP1 packet, SP2 packet or SP3 packet in (b) of FIG. 5). In this case, the STSs of the second STS field and the third STS field may be set to different STSs. For example, the STS of the first STS field may be an STS generated based on pre-shared first STS configuration information, and the STSs of the second STS field and the third STS field may be STSs generated based on the pre-shared first STS configuration information and different additional parameters (e.g., STS indexes set to different values).

The transport packet (or fragmented packet) may be generated from the SP1 packet (e.g., the SP1 packet in (b) of FIG. 5). In this case, the payload of the SP1 packet may be fragmented into a plurality of fragmented payloads (e.g., three fragmented payloads) according to settings. Further, the STS included in the first STS field may be set to the same value as the STS of the SP1 packet. The STSs included in the second STS field and the third STS field may be set to newly set different STS values different from the STS of the SP1 packet.

Referring to (b) of FIG. 12C, the transport packet may be fragmented into an SHR and a plurality of fragmented packets. The plurality of fragmented packets may include, e.g., a first fragmented packet including a first STS field, a PHR and a first fragmented payload, a second fragmented packet including a second STS field and a second fragmented payload, and a third fragmented packet including a third STS field and a third fragmented payload.

Each fragmented part (e.g., SHR, first fragmented packet, second fragmented packet, and third fragmented packet) may be transmitted thought the UWB channel at a preset transmission interval (T_interval).

In FIG. 12C, the SHR and the PHR are transmitted through a UWB channel. However, a transmission of the SHR and/or the PHR through a UWB channel may be omitted according to certain embodiments.

For example, when information for synchronization (or, all or part of the information included in the SHR) is transmitted through the NB channel, the SHR may not be transmitted through the UWB channel.

In another example, when information required for reception of the STS and/or payload (or all or part of the information included in the PHR) is transmitted through an NB channel and/or an OOB channel (e.g., a BIE channel), the PHR may not be transmitted through the UWB channel. Unlike in FIG. 12C, the PHR may not be included in the first fragmented packet transmitted through the UWB channel (i.e., the PHR may not be included between the first STS field and the first fragmented payload (Payload1) of the first fragmented packet).

Figure 12D:
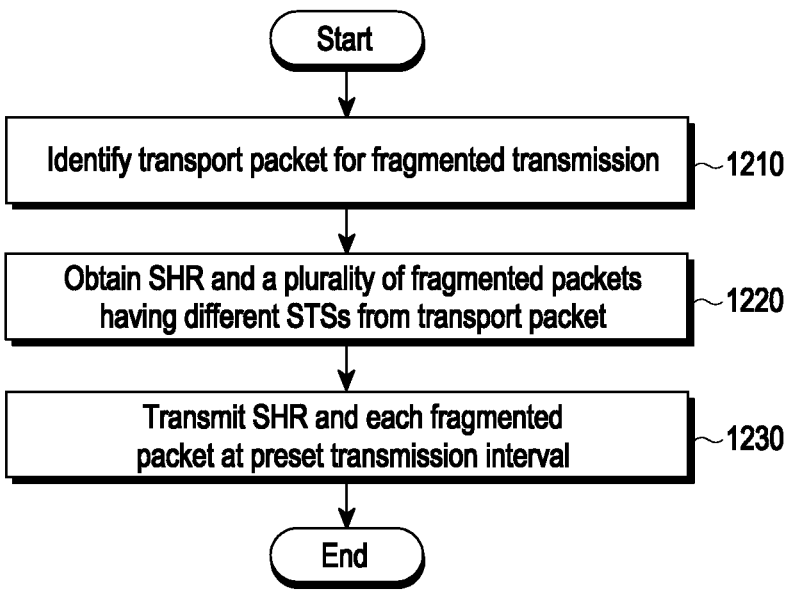
FIG. 12D illustrates a method in which an electronic device transmits a fragmented packet to another electronic device according to the second embodiment.

FIG. 12D illustrates a method in which an electronic device transmits a fragmented packet to another electronic device according to the second embodiment.

In step 1210, the electronic device identifies a transport packet for fragmented transmission. The transport packet may be a UWB PHY packet including data of a ranging message (e.g., RIM, RRM, RFM, etc.) for UWB ranging or data for other purposes (e.g., advertisement message data, service data, etc.). For example, if the transport packet is for a ranging message, the transport packet including the ranging message may be transmitted/received through the message exchange procedure of FIG. 7.

The transport packet may be a transport packet having the structure shown in (a) of FIGS. 12A, 12B, and 12C. In another embodiment, the transport packet may be an SP1 packet (e.g., the SP1 packet in (b) of FIG. 5).

Before step 1210, the electronic device may transmit configuration information (control information) for fragmented transmission to another electronic device. The electronic device may transmit information for fragmented transmission and/or first STS configuration information for generation of the first type STS. For a description of the information for fragmented transmission and the first STS configuration information, the description of FIG. 10 is referenced.

In step 1220, the electronic device obtains the SHR and/or a plurality of fragmented packets having different STSs from the transport packet. The plurality of fragmented packets having different STSs may include the first fragmented packet and the second fragmented packet shown in (b) of FIG. 12A, or the first fragmented packet and the second fragmented packet (or third fragmented packet) of FIG.

12B(b), or the first fragmented packet, the second fragmented packet, and the third fragmented packet shown in (b) of FIG. 12C.

In step 1230, the electronic device transmits the SHR and/or each fragmented packet at a preset transmission interval (T_interval) through, e.g., a UWB channel.

Third Embodiment

The third embodiment corresponds to an embodiment in which the STS for a plurality of fragmented payloads is set to an STS value (second type STS/STS for fragmented transmission) used only for fragmented transmission. The STS for fragmented transmission may be an STS intended for authentication and/or ranging, other than sync, to be used only for fragmented transmission of transport packets. The STS for fragmented transmission (second type STS) may be an STS (short STS) shorter in length than the first type STS (e.g., 128-bit long). In the disclosure, the packet format (configuration) of the transport packet according to the third embodiment may be referred to as a third packet format (configuration) and a third fragmented transmission packet format (configuration).

Information for fragmented transmission, first STS configuration information for generating a first type STS, and/or second STS configuration information for generating a second type STS may be exchanged between electronic devices. For example, the electronic device transmitting the transport packet may transmit the information for fragmented transmission, the first STS configuration information for generation of the first type STS, and/or the second STS configuration information for generation of the second type STS to the electronic device receiving the transport packet. For a description of the information for fragmented transmission, the first STS configuration information, and the second STS configuration information, the description of FIG. 10 is referenced.

Figure 13A:
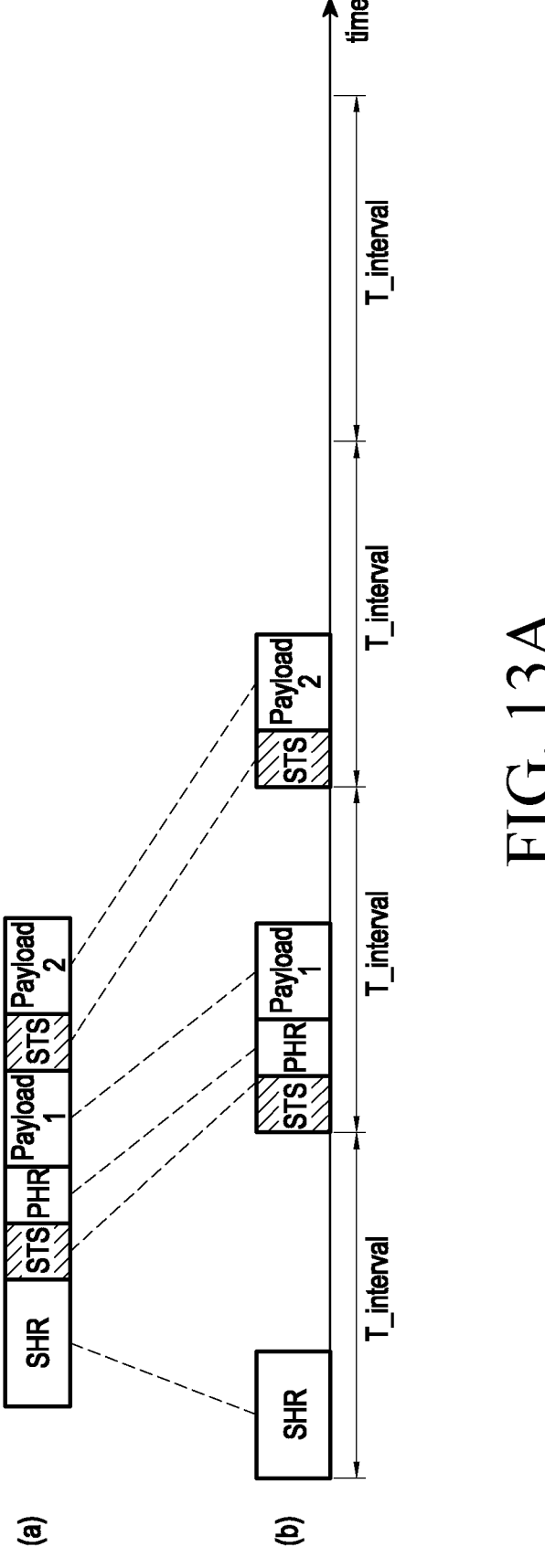
FIG. 13A illustrates a structure of a transport packet for transmission of a fragmented packet and a transmission method of a fragmented packet according to a third embodiment.

FIG. 13A illustrates a structure of a transport packet for transmission of a fragmented packet and a transmission method of a fragmented packet according to a third embodiment. The embodiment of FIG. 13A assumes that the transport packet includes two fragmented payloads for convenience of description.

Referring to (a) of FIG. 13A, a transport packet may include an SHR field, a PHR, a plurality of fragmented payloads, and/or a plurality of STS fields.

The plurality of STS fields may include a first STS field positioned between the SHR and PHR and a second STS field positioned between a first fragmented payload and a second fragmented payload.

In the embodiment of FIG. 13A, the first STS field and the second STS field may include the same STS for fragmented transmission.

The STS in the first STS field and the second STS field, which are STSs for fragmented transmission, may be STSs configured with values different from the STS used in the legacy packet format (e.g., the SP1 packet, the SP2 packet, or the SP3 packet in (b) of FIG. 5). For example, the STSs of the first STS field and the second STS field may be STSs generated based on pre-shared second STS configuration information. The STSs of the first STS field and the second STS field may be STSs set to shorter values than the STS of the legacy SP1 packet (e.g., the SP1 packet in (b) of FIG. 5).

The transport packet (or fragmented packet) may be generated from the SP0 packet (e.g., the SP0 packet in (b) of FIG. 5). In this case, the payload of the SP0 packet may be fragmented into a plurality of fragmented payloads (e.g., two fragmented payloads) according to settings. The STS values included in the first STS field and the second STS field may be set to the same STS value newly set for fragmented transmission. In this case, information (second STS configuration information) used to generate the STS for fragmented transmission, exchanged through the NB channel, may be used to generate the STS.

Referring to (b) of FIG. 13A, the transport packet may be fragmented into an SHR and a plurality of fragmented packets. The plurality of fragmented packets may include, e.g., a first fragmented packet including a first STS field, a PHR and a first fragmented payload, and a second fragmented packet including a second STS field and a second fragmented payload.

Each fragmented part (e.g., SHR, first fragmented packet and second fragmented packet) may be transmitted though the UWB channel at a preset transmission interval (T_interval).

In FIG. 13A, the SHR and the PHR are transmitted through a UWB channel. However, a transmission of the SHR and/or the PHR through a UWB channel may be omitted according to certain embodiments.

For example, when information for synchronization (or, all or part of the information included in the SHR) is transmitted through the NB channel, the SHR may not be transmitted through the UWB channel.

In another example, when information required for reception of the STS and/or payload (or all or part of the information included in the PHR) is transmitted through an NB channel and/or an OOB channel (e.g., a BIE channel), the PHR may not be transmitted through the UWB channel. Unlike in FIG. 13A, the PHR may not be included in the first fragmented packet transmitted through the UWB channel (i.e., the PHR may not be included between the first STS field and the first fragmented payload (Payload 1) of the first fragmented packet).

Figure 13B:
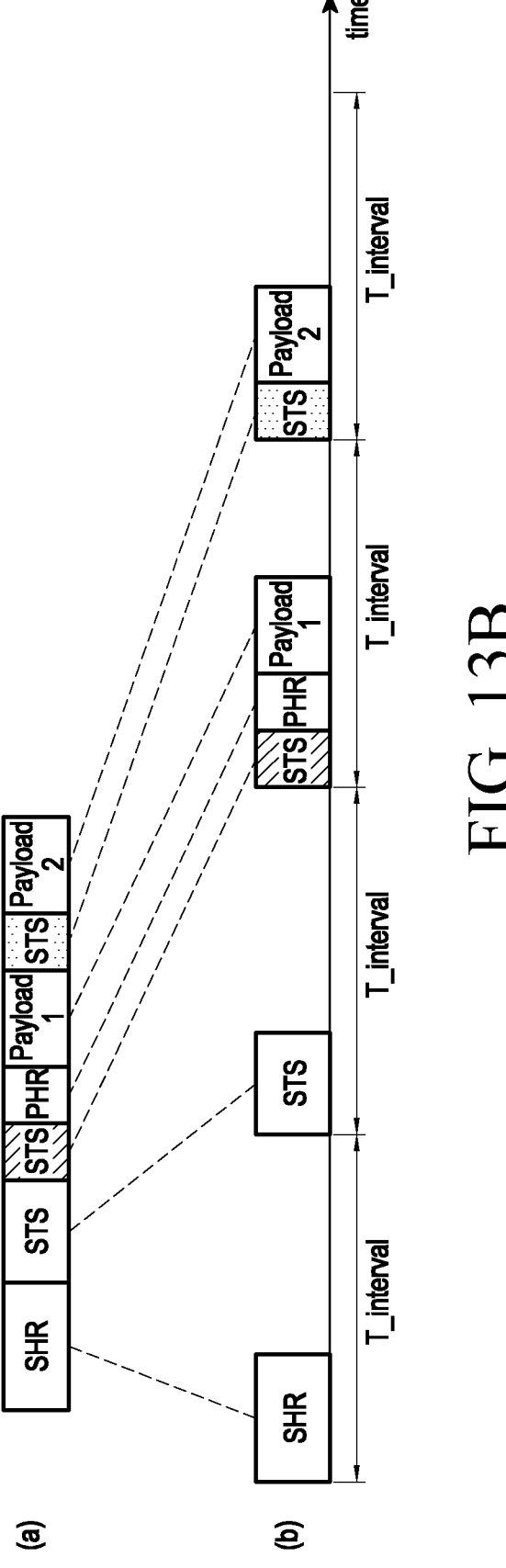
FIG. 13B illustrates another structure of a transport packet for transmission of a fragmented packet and a transmission method of a fragmented packet according to the third embodiment.

FIG. 13B illustrates another structure of a transport packet for transmission of a fragmented packet and a transmission method of a fragmented packet according to the third embodiment. The embodiment of FIG. 13B assumes that the transport packet includes two fragmented payloads for convenience of description.

Referring to (a) of FIG. 13B, a transport packet may include an SHR field, a PHR, a plurality of fragmented payloads, and/or a plurality of STS fields.

The plurality of STS fields may include a first STS field and second STS field positioned between the SHR and PHR and a third STS field positioned between a first fragmented payload and a second fragmented payload. As such, in the embodiment of FIG. 13B, unlike the embodiment of FIG. 13A, a plurality of STS fields may be included between the SHR and the PHR. The second STS field and the third STS field may be STS fields including an STS for fragmented transmission.

In the embodiment of FIG. 13B, the first STS field may include a different STS from the second and third STS fields.

The STS of the first STS field including an STS which is not an STS for fragmented transmission may be an STS configured with the same value as the STS used in the legacy SP packet (e.g., the SP1 packet, SP2 packet, or SP3 packet in (b) of FIG. 5), and the STSs of the first STS field and the second STS field including an STS for fragmented transmission may be STSs configured with values different from the STS used in the legacy SP packet (e.g., the SP1 packet, SP2 packet, or SP3 packet in (b) of FIG. 5). For example, the STS of the first STS field may be an STS (first type STS) generated based on pre-shared first STS configuration information, and the STSs of the second STS field and the third STS field may be different STSs (second type STSs) generated based on pre-shared second STS configuration information (e.g., different STS index configuration). The STSs of the second STS field and the third STS field may be STSs (short STSs) set to shorter values than the STS of the legacy SP1 packet (e.g., the SP1 packet in (b) of FIG. 5).

In the embodiment of FIG. 13B, the second STS field and the third STS field which are STSs for fragmented transmission may include different STSs.

The transport packet (or fragmented packet) may be generated from the SP1 packet (e.g., the SP1 packet in (b) of FIG. 5). In this case, the payload of the SP1 packet may be fragmented into a plurality of fragmented payloads (e.g., two fragmented payloads) according to settings. Further, the STS of the first STS field may include the STS of the legacy SP1 packet, and the STSs of the second STS field and the third STS field, respectively, may be set to different STS values newly set for fragmented transmission. In this case, information (second STS configuration information) used to generate the STS for fragmented transmission, exchanged through the NB channel, may be used to generate the STS.

Referring to (b) of FIG. 13B, the transport packet may be fragmented into an SHR, a first STS field, and a plurality of fragmented packets. The plurality of fragmented packets may include, e.g., a first fragmented packet including a second STS field, a PHR and a first fragmented payload, and a second fragmented packet including a third STS field and a second fragmented payload. As described above, the second STS field and the third STS field may include different STSs for fragmented transmission.

Each fragmented part (e.g., SHR, first STS field, first fragmented packet, and second fragmented packet) may be transmitted thought the UWB channel at a preset transmission interval (T_interval).

In FIG. 13B, the SHR and the PHR are transmitted through a UWB channel. However, a transmission of the SHR and/or the PHR through a UWB channel may be omitted according to certain embodiments.

For example, when information for synchronization (or, all or part of the information included in the SHR) is transmitted through the NB channel, the SHR may not be transmitted through the UWB channel.

In another example, when information required for reception of the STS and/or payload (or all or part of the information included in the PHR) is transmitted through an NB channel and/or an OOB channel (e.g., a BIE channel), the PHR may not be transmitted through the UWB channel. Unlike in FIG. 13B, the PHR may not be included in the first fragmented packet transmitted through the UWB channel (i.e., the PHR may not be included between the first STS field and the first fragmented payload (Payload 1) of the first fragmented packet).

Figure 13C:
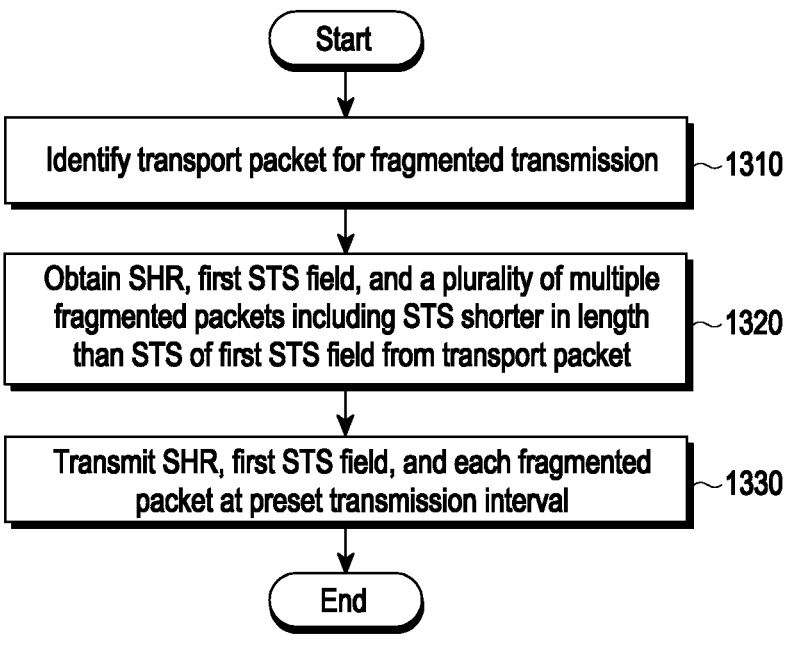
FIG. 13C illustrates a method in which an electronic device transmits a fragmented packet to another electronic device according to the third embodiment.

FIG. 13C illustrates a method in which an electronic device transmits a fragmented packet to another electronic device according to the third embodiment.

In step 1310, the electronic device identifies a transport packet for fragmented transmission. The transport packet may be a UWB PHY packet including data of a ranging message (e.g., RIM, RRM, RFM, etc.) for UWB ranging or data for other purposes (e.g., advertisement message data, service data, etc.). For example, if the transport packet is for a ranging message, the transport packet including the ranging message may be transmitted/received through the message exchange procedure of FIG. 7.

The transport packet may be a transport packet having the structure in (a) of FIGS. 13A and 13B. In another embodiment, the transport packet may be an SP0 packet or SP1 packet (e.g., the SP0 packet or SP1 packet in (b) of FIG. 5).

Before step 1310, the electronic device may transmit configuration information (control information) for fragmented transmission to another electronic device. The electronic device may transmit information for fragmented transmission, first STS configuration information for generating a first type STS, and/or second STS configuration information for generating a second type STS. For a description of the information for fragmented transmission, the first STS configuration information, and the second STS configuration information, the description of FIG. 10 is referenced. In an embodiment, the second STS configuration information may be transmitted through the NB channel.

In step 1320, the electronic device obtains the SHR, the first STS field, and/or a plurality of fragmented packets including the STS (STS for fragmented transmission) having a shorter length than the STS of the first STS field, from the transport packet. The STSs for fragmented transmission respectively included in the fragmented packets may have the same or different values.

The plurality of fragmented packets may include the first fragmented packet and the second fragmented packet shown in (b) of FIG. 13A or the first fragmented packet and the second fragmented packet shown in (b) of FIG. 13B.

In step 1330, the electronic device transmits the SHR, the first STS field, and/or each fragmented packet at a preset transmission interval (T_interval) through, e.g., a UWB channel.

Fourth Embodiment

The fourth embodiment corresponds to an embodiment in which one STS is fragmented into a plurality of STS segments and used. When one STS is composed of a plurality of STS segments (multiple segment configuration), each STS segment may be used to transmit a fragmented packet. In another embodiment, when one STS is composed of one STS segment (single segment configuration), the STS segment may be fragmented into as many subsegments as the number of the fragmented packets, and each STS subsegment may be used to transmit its respective corresponding fragmented packet. In the disclosure, the packet format (configuration) of the transport packet according to the fourth embodiment may be referred to as a fourth packet format (configuration) and a fourth fragmented transmission packet format (configuration).

The STS field may include at least one STS segment (e.g., 1 to 4 STS segments).

Figure 14:
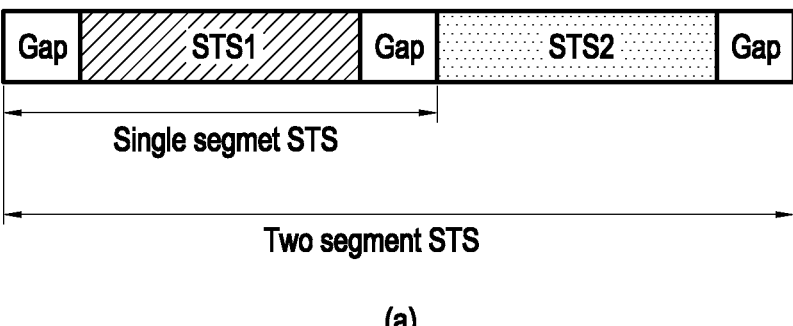
FIG. 14 illustrates a configuration of an STS field according to an embodiment.
Figure 14:

In the embodiment of FIG. 14, configuration information about the STS field may be exchanged between electronic devices. The configuration information about the STS field may indicate how many STS segments the STS field is composed of.

Further, information for fragmented transmission, first STS configuration information for generating a first type STS, and/or second STS configuration information for generating a second type STS may be exchanged between electronic devices. For example, the electronic device transmitting the transport packet may transmit the information for fragmented transmission, the first STS configuration information for generation of the first type STS, and/or the second STS configuration information for generation of the second type STS to the electronic device receiving the transport packet. For a description of the information for fragmented transmission, the first STS configuration information, and the second STS configuration information, the description of FIG. 10 is referenced.

FIG. 14 illustrates a configuration of an STS field according to an embodiment.

In (a) of FIG. 14, a configuration in which one STS field includes a plurality of STS segments is shown. In (b) of FIG. 14, another configuration in which one STS field includes a plurality of STS segments is shown, and in (c) of FIG. 14, a configuration in which one STS field includes a single STS segment is shown.

The STS fields in (a), (b), and (c) of FIGS. 14, 14 and 14 may be an example of the STS field of the SP1 packet (e.g., the SP1 packet in (b) of FIG. 5).

Referring to (a) of FIG. 14, one STS field may include a plurality of (e.g., two) STS segments having different values. One STS may be generated according to the STS configuration (e.g., first STS configuration information or second STS configuration information). One STS may be spread over a plurality of STS segments within one STS field. In this case, each STS segment may have a different value.

Referring to (b) of FIG. 14, one STS field may include a plurality of (e.g., two) STS segments having the same value. A plurality of STSs may be generated according to the same STS configuration (e.g., first STS configuration information or second STS configuration information), and each STS may be included in its respective corresponding one of the plurality of STS segments in the STS field. In this case, each STS segment may have the same value.

Referring to (c) of FIG. 14, one STS field may include one STS segment. One STS may be generated according to the STS configuration (e.g., first STS configuration information or second STS configuration information), and the STS may be spread over the one STS segment within one STS field.

Figure 15A:
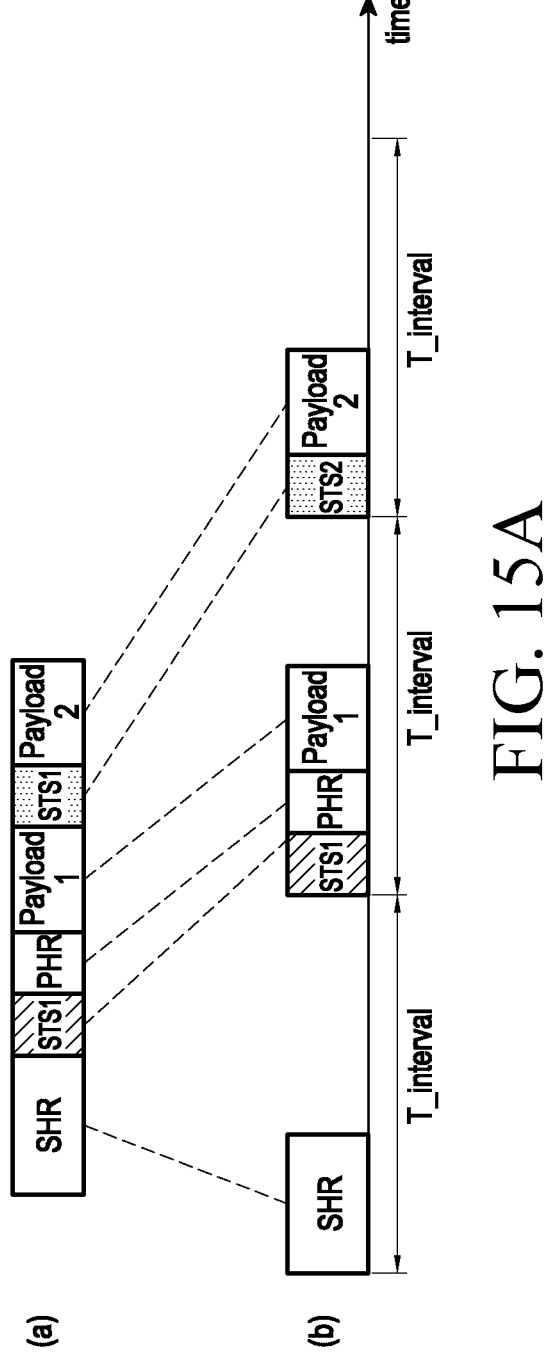
FIG. 15A illustrates a structure of a transport packet for transmission of a fragmented packet and a transmission method of a fragmented packet according to a fourth embodiment.

FIG. 15A illustrates a structure of a transport packet for transmission of a fragmented packet and a transmission method of a fragmented packet according to a fourth embodiment. The embodiment of FIG. 15A assumes that the configuration of the STS field is the configuration of the STS field of, e.g., (a) of FIG. 14 for convenience of description.

The embodiment of FIG. 15A assumes that the transport packet includes two fragmented payloads for convenience of description.

Referring to (a) of FIG. 15A, a transport packet may include an SHR field, a PHR, a plurality of fragmented payloads, and a plurality of STS fields.

The plurality of STS fields may include a first STS field positioned between the SHR and PHR and a second STS field positioned between a first fragmented payload and a second fragmented payload.

In the embodiment of FIG. 15A, the first STS field may include the first STS segment of the STS field in (a) of FIG. 14. The second STS field may include the second STS segment of the STS field in (a) of FIG. 14. The first STS segment may include an STS value different from that of the second STS segment.

The transport packet (or fragmented packet) may be generated from the SP1 packet (e.g., the SP1 packet in (b) of FIG. 5). In this case, the payload of the SP1 packet may be fragmented into a plurality of fragmented payloads (e.g., two fragmented payloads) according to settings. The first STS field may be set to the value of the first STS segment of the SP1 packet, and the second STS field may be set to the value of the second STS segment of the SP1 packet. In this case, the value of the first STS segment and the value of the second STS segment may be different.

Referring to (b) of FIG. 15A, the transport packet may be fragmented into an SHR and a plurality of fragmented packets. The plurality of fragmented packets may include, e.g., a first fragmented packet including a first STS field, a PHR and a first fragmented payload, and a second fragmented packet including a second STS field and a second fragmented payload.

Each fragmented part (e.g., SHR, first fragmented packet and second fragmented packet) may be transmitted through the UWB channel at a preset transmission interval (T_interval).

In FIG. 15A, the SHR and the PHR are transmitted through a UWB channel. However, a transmission of the SHR and/or the PHR through a UWB channel may be omitted according to certain embodiments.

For example, when information for synchronization (or, all or part of the information included in the SHR) is transmitted through the NB channel, the SHR may not be transmitted through the UWB channel.

In another example, when information required for reception of the STS and/or payload (or all or part of the information included in the PHR) is transmitted through an NB channel and/or an OOB channel (e.g., a BIE channel), the PHR may not be transmitted through the UWB channel. Unlike in FIG. 15A, the PHR may not be included in the first fragmented packet transmitted through the UWB channel (i.e., the PHR may not be included between the first STS field and the first fragmented payload (Payload 1) of the first fragmented packet).

Figure 15B:
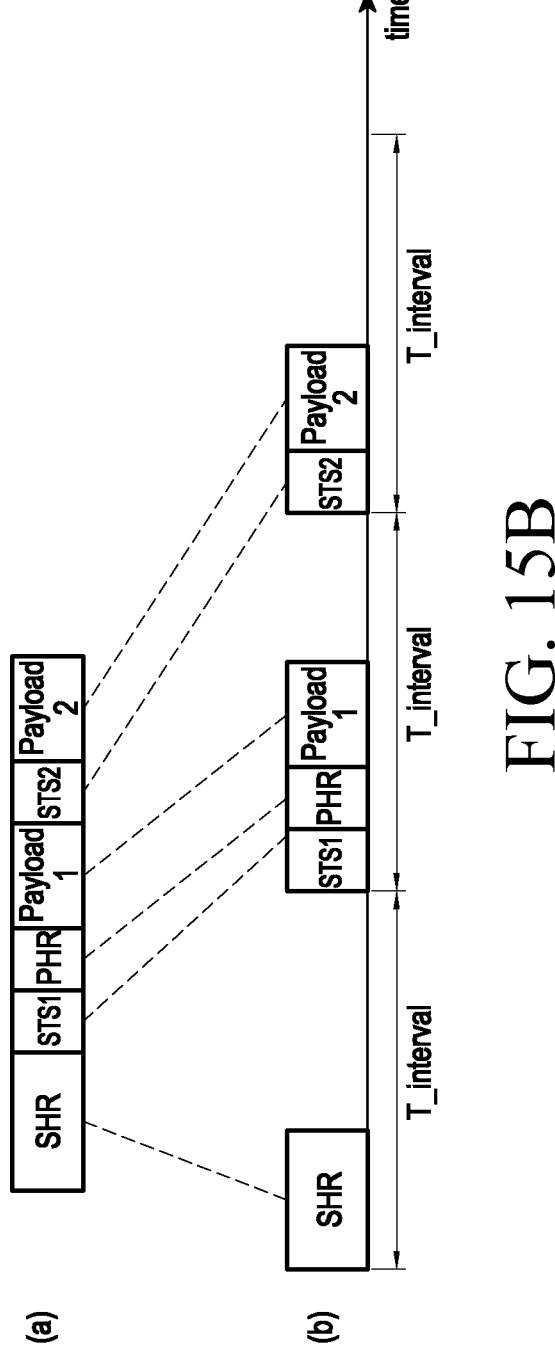
FIG. 15B illustrates another structure of a transport packet for transmission of a fragmented packet and a transmission method of a fragmented packet according to the fourth embodiment.

FIG. 15B illustrates another structure of a transport packet for transmission of a fragmented packet and a transmission method of a fragmented packet according to the fourth embodiment.

The embodiment of FIG. 15B assumes that the configuration of the STS field is the configuration of the STS field of, e.g., (b) of FIG. 14 for convenience of description.

The embodiment of FIG. 15B assumes that the transport packet includes two fragmented payloads for convenience of description.

Referring to (a) of FIG. 15B, a transport packet may include an SHR field, a PHR, a plurality of fragmented payloads, and a plurality of STS fields.

The plurality of STS fields may include a first STS field positioned between the SHR and PHR and a second STS field positioned between a first fragmented payload and a second fragmented payload.

In the embodiment of FIG. 15B, the first STS field may include the first STS segment of the STS field in (b) of FIG. 14. The second STS field may include the second STS segment of the STS field in (b) of FIG. 14. The first STS segment may include the same STS value as that of the second STS segment.

The transport packet (or fragmented packet) may be generated from the SP1 packet (e.g., the SP1 packet in (b) of FIG. 5). In this case, the payload of the SP1 packet may be fragmented into a plurality of fragmented payloads (e.g., two fragmented payloads) according to settings. The first STS field may be set to the value of the first STS segment of the SP1 packet, and the second STS field may be set to the value of the second STS segment of the SP1 packet. In this case, the value of the first STS segment and the value of the second STS segment may be the same.

Referring to (b) of FIG. 15B, the transport packet may be fragmented into an SHR and a plurality of fragmented packets. The plurality of fragmented packets may include, e.g., a first fragmented packet including a first STS field, a PHR and a first fragmented payload, and a second fragmented packet including a second STS field and a second fragmented payload.

Each fragmented part (e.g., SHR, first fragmented packet and second fragmented packet) may be transmitted through the UWB channel at a preset transmission interval (T_interval).

In FIG. 15B, the SHR and the PHR are transmitted through a UWB channel. However, a transmission of the SHR and/or the PHR through a UWB channel may be omitted according to certain embodiments.

For example, when information for synchronization (or, all or part of the information included in the SHR) is transmitted through the NB channel, the SHR may not be transmitted through the UWB channel.

In another example, when information required for reception of the STS and/or payload (or all or part of the information included in the PHR) is transmitted through an NB channel and/or an OOB channel (e.g., a BIE channel), the PHR may not be transmitted through the UWB channel. Unlike in FIG. 15B, the PHR may not be included in the first fragmented packet transmitted through the UWB channel (i.e., the PHR may not be included between the first STS field and the first fragmented payload (Payload 1) of the first fragmented packet).

Figure 15C:
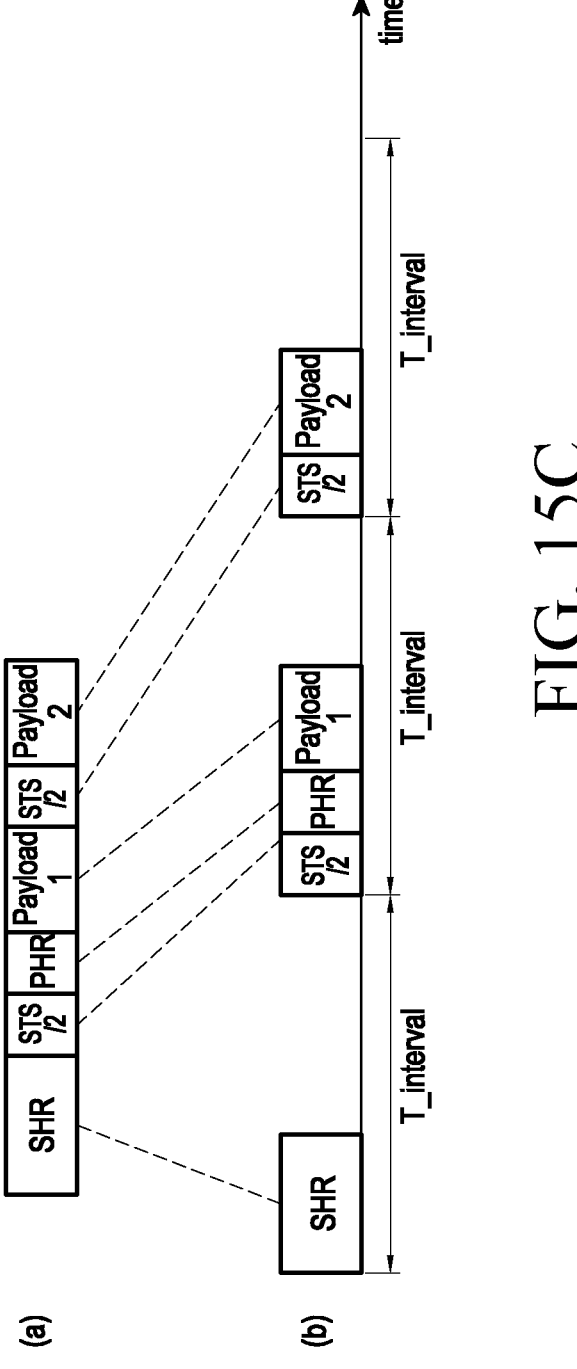
FIG. 15C illustrates another structure of a transport packet for transmission of a fragmented packet and a transmission method of a fragmented packet according to the fourth embodiment.

FIG. 15C illustrates another structure of a transport packet for transmission of a fragmented packet and a transmission method of a fragmented packet according to the fourth embodiment.

The embodiment of FIG. 15C assumes that the configuration of the STS field is the configuration of the STS field of, e.g., in (c) of FIG. 14 for convenience of description.

The embodiment of FIG. 15C assumes that the transport packet includes two fragmented payloads for convenience of description.

In the embodiment of FIG. 15C, one STS segment in the STS field may be fragmented by the number of fragmented payloads/packets and be used.

Referring to (a) of FIG. 15C, a transport packet may include an SHR field, a PHR, a plurality of fragmented payloads, and a plurality of STS fields.

The plurality of STS fields may include a first STS field positioned between the SHR and PHR and a second STS field positioned between a first fragmented payload and a second fragmented payload.

In the embodiment of FIG. 15C, the first STS field may include one STS segment (STS/2) among STS segments (subsegments) into which the STS segment of the STS field in (c) of FIG. 14 is fragmented by the number of the fragmented payloads, and the second STS field may include another STS segment (STS/2) among the STS segments (subsegments) into which the STS segment of the STS field in (c) of FIG. 14 is fragmented by the number of the fragmented payloads.

The transport packet (or fragmented packet) may be generated from the SP1 packet (e.g., the SP1 packet in (b) of FIG. 5). In this case, the payload of the SP1 packet may be fragmented into a plurality of fragmented payloads (e.g., two fragmented payloads) according to settings. Further, one STS segment may be fragmented by the number of fragmented payloads/packets. For example, as shown, one STS segment may be fragmented into two STS segments. In this case, the first STS field may be set to the value of the first STS segment among the fragmented STS segments, and the second STS field may be set to the value of the next STS segment among the fragmented STS segments.

Referring to (b) of FIG. 15C, the transport packet may be fragmented into an SHR and a plurality of fragmented packets. The plurality of fragmented packets may include, e.g., a first fragmented packet including a first STS field, a PHR and a first fragmented payload, and a second fragmented packet including a second STS field and a second fragmented payload.

Each fragmented part (e.g., SHR, first fragmented packet and second fragmented packet) may be transmitted through the UWB channel at a preset transmission interval (T_interval).

In FIG. 15C, the SHR and the PHR are transmitted through a UWB channel. However, a transmission of the SHR and/or the PHR through a UWB channel may be omitted according to certain embodiments.

For example, when information for synchronization (or, all or part of the information included in the SHR) is transmitted through the NB channel, the SHR may not be transmitted through the UWB channel.

In another example, when information required for reception of the STS and/or payload (or all or part of the information included in the PHR) is transmitted through an NB channel and/or an OOB channel (e.g., a BIE channel), the PHR may not be transmitted through the UWB channel. Unlike in FIG. 15C, the PHR may not be included in the first fragmented packet transmitted through the UWB channel (i.e., the PHR may not be included between the first STS field and the first fragmented payload (Payload 1) of the first fragmented packet).

Figure 15D:
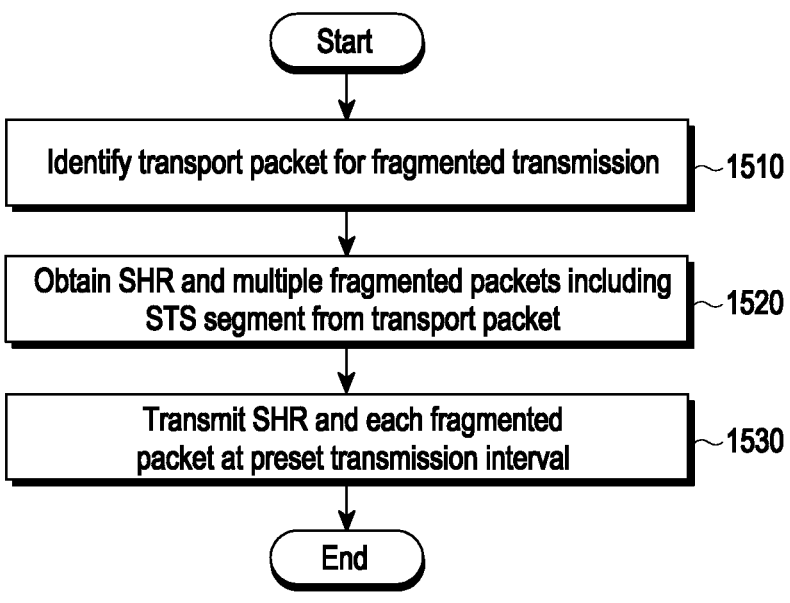
FIG. 15D illustrates a method in which an electronic device transmits a fragmented packet to another electronic device according to the fourth embodiment.

FIG. 15D illustrates a method in which an electronic device transmits a fragmented packet to another electronic device according to the fourth embodiment.

In step 1510, the electronic device identifies a transport packet for fragmenting. The transport packet may be a UWB PHY packet including data of a ranging message (e.g., RIM, RRM, RFM, etc.) for UWB ranging or data for other purposes (e.g., advertisement message data, service data, etc.). For example, if the transport packet is for a ranging message, the transport packet including the ranging message may be transmitted/received through the message exchange procedure of FIG. 7.

The transport packet may be a transport packet having the structure in (a) of FIGS. 15A, 15B, and 15C. In another embodiment, the transport packet may be an SP1 packet (e.g., the SP1 packet in (b) of FIG. 5).

Before step 1510, the electronic device may transmit configuration information (control information) for transmission of fragmented packets to another electronic device. The electronic device may transmit configuration information about the STS field. The electronic device may transmit information for fragmented transmission, first STS configuration information for generating a first type STS, and/or second STS configuration information for generating a second type STS. For a description of the information for fragmented transmission, the first STS configuration information, and the second STS configuration information, the description of FIG. 10 is referenced. The configuration information may be transmitted through the NB channel.

In step 1520, the electronic device obtains the SHR and/or the plurality of fragmented packets having the STS segment value from the transport packet. The plurality of fragmented packets having the STS segment value may include the first fragmented packet and the second fragmented packet in (b) of FIG. 15A, or the first fragmented packet and the second fragmented packet in (b) of FIG. 15B, or the first fragmented packet and the second fragmented packet in (b) of FIG. 15C.

In step 1530, the electronic device transmits the SHR and/or each fragmented packet at a preset transmission interval (T_interval) through, e.g., a UWB channel.

As such, in the embodiment of FIG. 15, unlike the embodiments of FIGS. 11 to 13, each fragmented packet does not include one whole (STS) value, but a partial value (segment value) of one whole STS.

Figure 16:
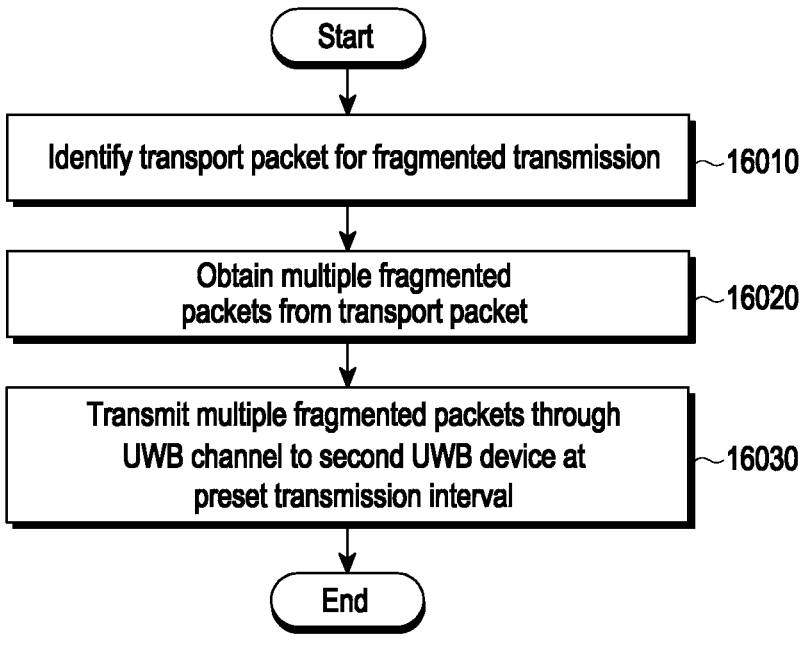
FIG. 16 illustrates a method by a first UWB device according to an embodiment.

FIG. 16 illustrates a method by a first UWB device according to an embodiment.

In the embodiment of FIG. 16, a first UWB device may be the electronic device of FIG. 1 or the first electronic device of FIG. 2, and the second UWB device may be the electronic device of FIG. 1 or the first electronic device of FIG. 2.

Referring to FIG. 16, the first UWB device identifies the transport packet for fragmented transmission in step 16010.

The first UWB device obtains a plurality of fragmented packets from the transport packet in step 16020.

The first UWB device transmits the plurality of fragmented packets to the second UWB device through a UWB channel at a preset transmission interval in step 16030.

Each of the plurality of fragmented packets may include an STS field and a fragmented payload, and the STS field may be included in the front end of the fragmented packet.

The plurality of fragmented packets may include a first fragmented packet including a first STS field, a PHY header, and a first fragmented payload, and a second fragmented packet including a second STS field and a second frag-mented payload.

The STS of the first STS field may be the same as the STS of the second STS field. Alternatively, the STS of the first STS field may be different from the STS of the second STS field.

The STS of the second STS field may have a shorter length than the STS of the first STS field.

One STS may be configured with one or more STS segments. When the STS is configured with a plurality of STS segments, the data of each STS segment may be included in the STS field of its respective corresponding fragmented packet and, when the STS is configured with a single STS segment, the data of each of STS subsegments into which the STS segment is fragmented may be included in the STS field of its respective fragmented packet.

The STS of the second STS field may be the same or different from the STS of the third STS packet that follows the second fragmented packet.

The method may further include transmitting at least one of the information for fragmented transmission or the first STS configuration information for STS generation to the second UWB device. The information for fragmented trans-mission may include at least one of packet configuration information for the transport packet or information about the number of the fragmented packets, and the first STS con-figuration information may include at least one of the STS generation data or STS key used for STS generation.

The method may further include transmitting second STS configuration information for generation of an STS used only for fragmented transmission to the second UWB device through the NB channel to the second UWB device. The second STS configuration information may include at least one of STS generation data, STS key, or STS index infor-mation used for generating an STS used only for fragmented transmission.

Figure 17:
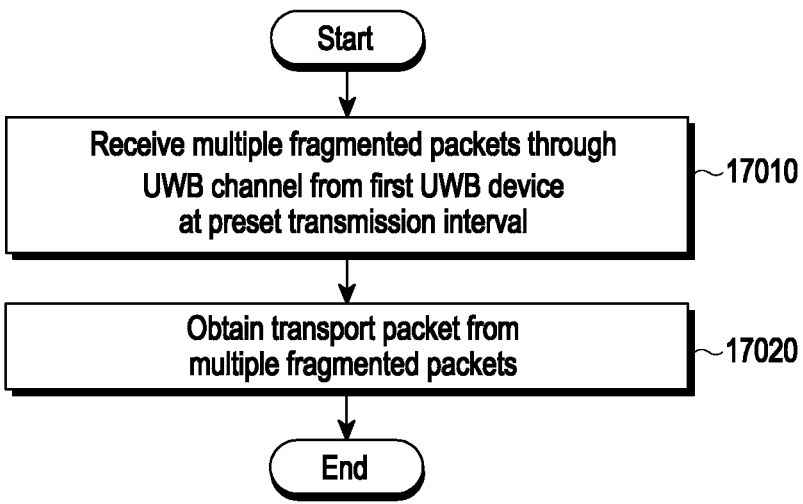
FIG. 17 illustrates a method by a second UWB device according to an embodiment.

FIG. 17 illustrates a method by a second UWB device according to an embodiment.

In the embodiment of FIG. 17, a first UWB device may be the electronic device of FIG. 1 or the first electronic device of FIG. 2, and the second UWB device may be the electronic device of FIG. 1 or the first electronic device of FIG. 2.

Referring to FIG. 17, the second UWB device receives a plurality of fragmented packets from the first UWB device through a UWB channel at a preset transmission interval in step 17010.

The second UWB device obtains the transport packet from the plurality of fragmented packets in step 17020.

Each of the plurality of fragmented packets may include an STS field and a fragmented payload, and the STS field may be included in the front end of the fragmented packet.

The plurality of fragmented packets may include a first fragmented packet including a first STS field, a PHY header, and a first fragmented payload, and a second fragmented packet including a second STS field and a second frag-mented payload.

The STS of the first STS field may be the same as the STS of the second STS field. Alternatively, the STS of the first STS field may be different from the STS of the second STS field.

The STS of the second STS field may have a shorter length than the STS of the first STS field.

One STS may be configured with one or more STS segments. When the STS is configured with a plurality of STS segments, the data of each STS segment may be included in the STS field of its respective corresponding fragmented packet and, when the STS is configured with a single STS segment, the data of each of STS subsegments into which the STS segment is fragmented may be included in the STS field of its respective fragmented packet.

The STS of the second STS field may be the same or different from the STS of the third STS packet that follows the second fragmented packet.

The method may further include receiving at least one of the information for fragmented transmission or the first STS configuration information for STS generation from the first UWB device. The information for fragmented transmission may include at least one of packet configuration information for the transport packet or information about the number of the fragmented packets, and the first STS configuration information may include at least one of the STS generation data or STS key used for STS generation.

The method may further include receiving second STS configuration information for generation of an STS used only for fragmented transmission to the second UWB device through the NB channel from the first UWB device. The second STS configuration information may include at least one of STS generation data, STS key, or STS index infor-mation used for generating an STS used only for fragmented transmission.

Figure 18:
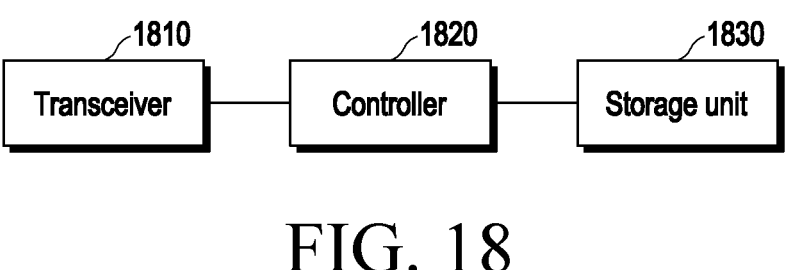
FIG. 18 illustrates a first UWB device according to an embodiment.

FIG. 18 illustrates a first UWB device according to an embodiment.

In the embodiment of FIG. 18, a first UWB device may be the electronic device of FIG. 1 or the first electronic device of FIG. 2, and the second UWB device may be the electronic device of FIG. 1 or the first electronic device of FIG. 2. In the embodiment of FIG. 18, the first UWB device may be a UWB device serving as, e.g., a controller.

Referring to FIG. 18, the first UWB device may include a transceiver 1810, a controller 1820, and a storage unit 1830. In the disclosure, the controller may be defined as a circuit or application-specific integrated circuit (ASIC) or at least one processor.

The transceiver 1810 may transmit and receive signals to/from another entity. The transceiver 1810 may transmit/receive data to/from another UWB device through, e.g., NB communication, UWB communication or OOB communication (e.g., BIE communication).

The controller 1820 may control the overall operation of the electronic device. For example, the controller 1820 may control inter-block signal flow to perform the operations according to the above-described flowchart. Specifically, the controller 1820 may control the operations for fragmented transmission of the first UWB device described above with reference to FIGS. 1 to 17.

The storage unit 1830 may store at least one of information transmitted/received via the transceiver 1810 and information generated via the controller 1820. For example, the storage unit 1830 may store information and data necessary for performing the methods, e.g., fragmented transmission, described above with reference to FIGS. 1 to 17.

Figure 19:
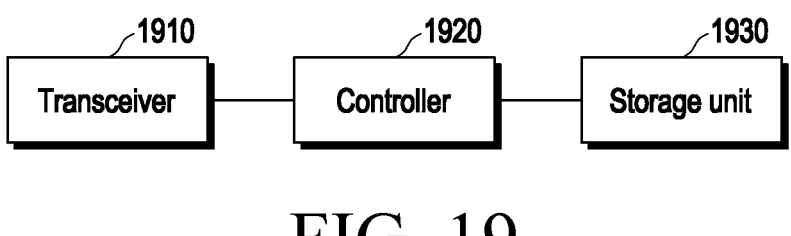
FIG. 19 illustrates a second UWB device according to an embodiment.

FIG. 19 illustrates a second UWB device according to an embodiment.

In the embodiment of FIG. 16, a first UWB device may be the electronic device of FIG. 1 or the first electronic device of FIG. 2, and the second UWB device may be the electronic device of FIG. 1 or the first electronic device of FIG. 2. In the embodiment of FIG. 19, the second UWB device may be a UWB device serving as a controlee.

Referring to FIG. 19, the first UWB device may include a transceiver 1910, a controller 1920, and a storage unit 1930. In the disclosure, the controller may be defined as a circuit or ASIC or at least one processor.

The transceiver 1910 may transmit and receive signals to/from another entity. The transceiver 1910 may transmit/receive data to/from another UWB device through, e.g., NB communication, UWB communication or OOB communication (e.g., BIE communication).

The controller 1920 may control the overall operation of the electronic device according to an embodiment. For example, the controller 1920 may control inter-block signal flow to perform the operations according to the above-described flowchart. Specifically, the controller 1920 may control the operations for fragmented transmission of the first UWB device described above with reference to FIGS. 1 to 17.

The storage unit 1930 may store at least one of information transmitted/received via the transceiver 1910 and information generated via the controller 1920. For example, the storage unit 1930 may store information and data necessary for performing the methods, e.g., fragmented transmission, described above with reference to FIGS. 1 to 17.

In the above-described specific embodiments, the components included in the disclosure are represented in singular or plural forms depending on specific embodiments disclosed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

Although specific embodiments of the disclosure have been described above, various changes may be made thereto without departing from the scope of the disclosure. Thus, the scope of the disclosure should not be limited to the above-described embodiments, and should rather be defined by the following claims and equivalents thereof.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method by a first ultra-wide band (UWB) device, comprising:
identifying a transport packet for fragmented transmission;
obtaining a plurality of fragmented packets from the transport packet; and
transmitting the plurality of fragmented packets through a UWB channel to a second UWB device at a preset transmission interval,
wherein each of the plurality of fragmented packets includes a scrambled timestamp sequence (STS) field and a fragmented payload, and
wherein the STS field is included in a front end of the fragmented packet,
wherein the plurality of fragmented packets include a first fragmented packet including a first STS field, a physical layer (PHY) header, and a first fragmented payload, and a second fragmented packet including a second STS field and a second fragmented payload, and
wherein an STS of the second STS field is shorter in length than an STS of the first STS field.

2. The method of claim 1, wherein the STS of the first STS field is different from the STS of the second STS field.

3. The method of claim 1, wherein one STS includes a single STS segment or a plurality of STS segments, and
wherein in case that an STS includes the plurality of STS segments, data of each of the plurality of STS segments is included in the STS field of a respective corresponding packet, and in case that an STS includes the single STS segment, data of each of STS subsegments into which the single STS segment is fragmented is included in the STS field of a respective corresponding fragmented packet.

4. The method of claim 1, wherein the STS of the second STS field is the same as or different from an STS of a third STS packet following the second fragmented packet.

5. The method of claim 1, further comprising transmitting at least one of information for fragmented transmission or first STS configuration information for STS generation to the second UWB device,
wherein the information for fragmented transmission includes at least one of packet configuration information on the transport packet or information on a number of the fragmented packets, and the first STS configuration information includes at least one of STS generation data or an STS key used for STS generation.

6. The method of claim 5, further comprising transmitting second STS configuration information for STS generation used only for the fragmented transmission to the second UWB device through a narrowband (NB) channel,
wherein the second STS configuration information includes at least one of STS generation data, an STS key, or STS index information used for STS generation used only for the fragmented transmission.

7. A method by a second ultra-wide band (UWB) device, comprising:
receiving a plurality of fragmented packets from a first UWB device through a UWB channel at a preset transmission interval; and
obtaining a transport packet from the plurality of fragmented packets,
wherein each of the plurality of fragmented packets includes a scrambled timestamp sequence (STS) field and a fragmented payload, and
wherein the STS field is included in a front end of the fragmented packet, wherein the plurality of fragmented packets include a first fragmented packet including a first STS field, a physical layer (PHY) header, and a first fragmented payload, and a second fragmented packet including a second STS field and a second fragmented payload, and wherein an STS of the second STS field is shorter in length than an STS of the first STS field.

8. The method of claim 7, wherein the STS of the first STS field is different from the STS of the second STS field.

9. The method of claim 7, wherein one STS includes a single STS segment or a plurality of STS segments, and wherein in case that an STS includes the plurality of STS segments, data of each of the plurality of STS segments is included in the STS field of a respective corresponding packet, and in case that an STS includes the single STS segment, data of each of STS subsegments into which the single STS segment is fragmented is included in the STS field of a respective corresponding fragmented packet.

10. The method of claim 7, wherein the STS of the second STS field is the same as or different from an STS of a third STS packet following the second fragmented packet.

11. The method of claim 7, further comprising receiving at least one of information for fragmented transmission or first STS configuration information for STS generation from the first UWB device, wherein the information for fragmented transmission includes at least one of packet configuration information on the transport packet or information on a number of the fragmented packets, and the first STS configuration information includes at least one of STS generation data or an STS key used for STS generation.

12. The method of claim 11, further comprising receiving second STS configuration information for STS generation used only for the fragmented transmission from the first UWB device through a narrowband (NB) channel, wherein the second STS configuration information includes at least one of STS generation data, an STS key, or STS index information used for STS generation used only for the fragmented transmission.

13. A first ultra-wide band (UWB) device, comprising:
a transceiver; and
at least one processor configured to:
    identify a transport packet for fragmented transmission;
    obtain a plurality of fragmented packets from the transport packet; and
    transmit the plurality of fragmented packets through a UWB channel to a second UWB device at a preset transmission interval,
wherein each of the plurality of fragmented packets includes a scrambled timestamp sequence (STS) field and a fragmented payload, and
wherein the STS field is included in a front end of the fragmented packet,
wherein the plurality of fragmented packets include a first fragmented packet including a first STS field, a physical layer (PHY) header, and a first fragmented payload, and a second fragmented packet including a second STS field and a second fragmented payload, and
wherein an STS of the second STS field is shorter in length than an STS of the first STS field.

14. A second ultra-wide band (UWB) device, comprising:
a transceiver; and
at least one processor configured to:
    receive a plurality of fragmented packets from a first UWB device through a UWB channel at a preset transmission interval; and
    obtain a transport packet from the plurality of fragmented packets,
wherein each of the plurality of fragmented packets includes a scrambled timestamp sequence (STS) field and a fragmented payload, and
wherein the STS field is included in a front end of the fragmented packet,
wherein the plurality of fragmented packets include a first fragmented packet including a first STS field, a physical layer (PHY) header, and a first fragmented payload, and a second fragmented packet including a second STS field and a second fragmented payload, and
wherein an STS of the second STS field is shorter in length than an STS of the first STS field.

* * * * *